United States Patent
Sharma et al.

(10) Patent No.: US 11,882,613 B2
(45) Date of Patent: Jan. 23, 2024

(54) TERMINAL DEVICE, INFRASTRUCTURE EQUIPMENT AND METHODS

(71) Applicant: Sony Group Corporation, Tokyo (JP)

(72) Inventors: Vivek Sharma, Basingstoke (GB); Yassin Aden Awad, Basingstoke (GB); Yuxin Wei, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 230 days.

(21) Appl. No.: 17/422,747

(22) PCT Filed: Jan. 9, 2020

(86) PCT No.: PCT/EP2020/050438
§ 371 (c)(1),
(2) Date: Jul. 14, 2021

(87) PCT Pub. No.: WO2020/151957
PCT Pub. Date: Jul. 30, 2020

(65) Prior Publication Data
US 2022/0132615 A1  Apr. 28, 2022

(30) Foreign Application Priority Data
Jan. 21, 2019  (EP) .................................. 19152906

(51) Int. Cl.
*H04W 76/19* (2018.01)
*H04W 76/15* (2018.01)
(Continued)

(52) U.S. Cl.
CPC ....... *H04W 76/19* (2018.02); *H04W 12/0431* (2021.01); *H04W 12/06* (2013.01); *H04W 48/20* (2013.01); *H04W 76/15* (2018.02)

(58) Field of Classification Search
CPC ............. H04W 12/0431; H04W 12/06; H04W 12/062; H04W 48/20; H04W 76/15; H04W 76/18; H04W 76/19; H04W 76/20
See application file for complete search history.

(56) References Cited

U.S. PATENT DOCUMENTS

2014/0355872 A1  12/2014  Shih
2015/0045035 A1*  2/2015  Nigam .............. H04W 72/1268
                                                    455/436
(Continued)

FOREIGN PATENT DOCUMENTS

WO    2015/066406 A2    5/2015
WO    2015/176738 A1   11/2015
WO    2016/045625 A2    3/2016

OTHER PUBLICATIONS

International Search Report and Written Opinion dated Apr. 20, 2020, received for PCT Application PCT/EP2020/050438, Filed on Jan. 9, 2020, 13 pages.
(Continued)

*Primary Examiner* — Jean A Gelin
(74) *Attorney, Agent, or Firm* — XSENSUS LLP

(57) ABSTRACT

A method of communicating data by a terminal device in a wireless telecommunication system comprising a first radio access node and a second radio access node, the method comprising establishing an RRC connection with the first radio access node, entering a dual connectivity mode of operation for the terminal device in which the first radio access node acts as a master radio access node and the second radio access node acts as a secondary radio access node, communicating the same first data between the terminal device and the first radio access node and between the terminal device and the second radio access node, determining that radio link failure criteria are satisfied in respect of at least the first radio access node, and communicating second data between the terminal device and the second radio access node.

12 Claims, 8 Drawing Sheets

(51) Int. Cl.
  *H04W 12/0431* (2021.01)
  *H04W 12/06* (2021.01)
  *H04W 48/20* (2009.01)

(56) References Cited

U.S. PATENT DOCUMENTS

| | | | |
|---|---|---|---|
| 2015/0117183 A1* | 4/2015 | Heo | H04W 48/08 370/242 |
| 2016/0183321 A1 | 6/2016 | Wen et al. | |
| 2017/0374705 A1* | 12/2017 | Mitsui | H04W 36/0058 |
| 2018/0184362 A1* | 6/2018 | Babaei | H04W 48/10 |

OTHER PUBLICATIONS

3GPP, "Study on Enhancement of Ultra-Reliable Low-Latency Communication (URLLC) Support in the 5G Core Network (5GC) (Release 16)" 3GPP TR 23.725 V16.0.0, Dec. 2018, pp. 1-76.
3GPPP, "Evolved Universal Terrestrial Radio Access (E-UTRA) and Evolved Universal Terrestrial Radio Access Network (E-UTRAN); Overall description; Stage 2 (Release 13)" 3GPP TS 36.300 V13. 2.0, Dec. 2015, pp. 1-290.
3GPP, "Technical Specification Group Radio Access Network; Evolved Universal Terrestrial Radio Access (E-UTRA) and NR; Multi connectivity; Stage 2 (Release 15)", 3GPP TS 37.340 V15. 3.0, Sep. 2018, pp. 1-59.
3GPP, "NR; Radio Resource Control (RRC) Protocol Specification (Release 16)", 3GPP TS 38.331 V16.0.0, Mar. 2020, pp. 1-835.
3GPP, "NR; Radio Resource Control (RRC) protocol specification (Release 15)" 3GPP TS 38.331 V15.3.0, Sep. 2018, pp. 1-445.
Holma et al., "LTE for UMTS OFDMA and SC-FDMA Based Radio Access", John Wiley and Sons, 2009, pp. 25-27.
NTT Docomo Inc., "Revised WID on New Radio Access Technology", 3GPP TSG RAN Meeting #78, RP-172834, Dec. 18-21, 2017, 11 pages.
NTT Docomo, "New SID Proposal: Study on New Radio Access Technology", 3GPP TSG RAN Meeting #71, RP-160671, Mar. 7-10, 2016, 8 pages.
Huawei et al., "New SID on Physical Layer Enhancements for NR Ultra-Reliable and Low Latency Communication (URLLC)" 3GPP TSG-RAN#81, RP-182089, Sep. 10-13, 2018, 5 pages.

* cited by examiner

TERMINAL DEVICE, INFRASTRUCTURE EQUIPMENT AND METHODS

CROSS-REFERENCE TO RELATED APPLICATIONS

The present application is based on PCT filing PCT/EP2020/050438, filed Jan. 9, 2020, which claims priority to EP 19152906.4, filed Jan. 21, 2019, the entire contents of each are incorporated herein by reference.

BACKGROUND

Field

The present disclosure relates to terminal devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term in Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to efficiently support communications with an ever-increasing range of devices and data traffic profiles than existing systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles and requirements.

One example use case currently considered to be of interest for next generation wireless communication systems includes so-called Ultra Reliable and Low Latency Communications (URLLC). See, for example, the 3GPP documents RP-160671, "New SID Proposal: Study on New Radio Access Technology," NTT DOCOMO, RAN #71 [1]; RP-172834, "Work Item on New Radio (NR) Access Technology," NTT DOCOMO, RAN #78 [2]; and RP-182089, "New SID on Physical Layer Enhancements for NR Ultra-Reliable and Low Latency Communication (URLLC)," Huawei, HiSilicon, Nokia, Nokia Shanghai Bell, RAN #81 [3].

URLLC services are low latency and high reliability services, for example aiming to transmit data through the radio network with a target packet transit time (i.e. time from ingress of a layer 2 packet to its egress from the network) of 1 ms (i.e. so that each piece of URLLC data needs to be scheduled and transmitted across the physical layer in a time that is shorter than 1 ms). URLLC data transmissions are also expected to comprise relatively small amounts of data and to have a correspondingly short scheduling time, i.e. with control signalling and data transmitter with a frame duration that is less than that of eMBB (a typical eMBB frame duration may be expected to be 1 ms, which corresponds to a single slot for 3GPP 5G 15kHz numerology). A further requirement for URLLC is high reliability with proposals for URLLC packets to be received with a 99.999% reliability within the 1 ms target packet transit time, and recent proposals for this to be increased to 99.9999% with a latency between 0.5 ms and 1 ms.

The inventors have recognized the desire to support transmissions with increased reliability, such as for URLLC data, in wireless telecommunications systems gives rise to new challenges that need to be addressed to help optimise the operation of wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
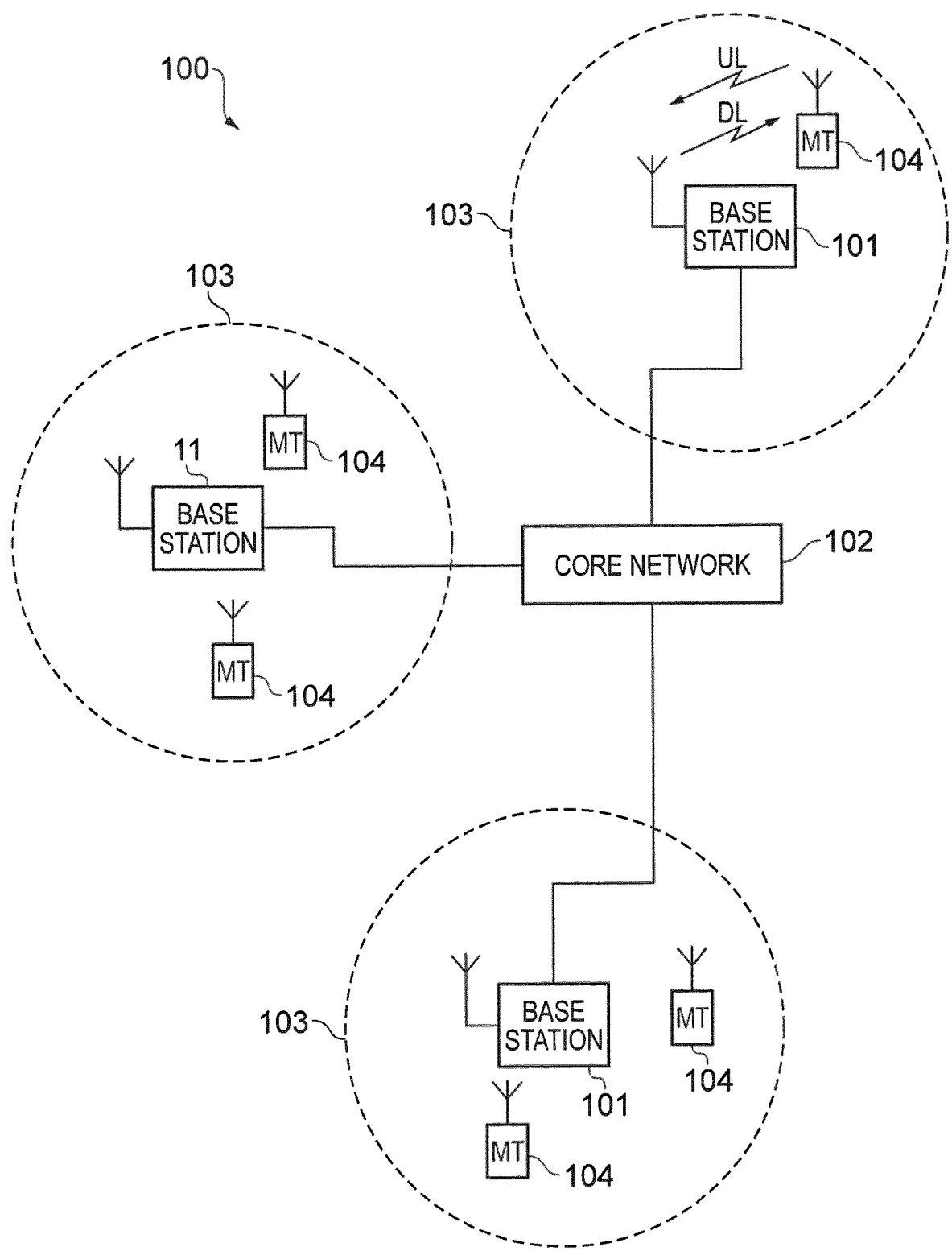
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body and associated proposals, and also described in many books on the subject, for example, Holma H. and Toskala A [4]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 within which data can be communicated to and from terminal devices 104. Data is transmitted from base stations 101 to terminal devices 104 within their respective coverage areas 103 via a radio downlink. The coverage area may be referred to as a cell. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
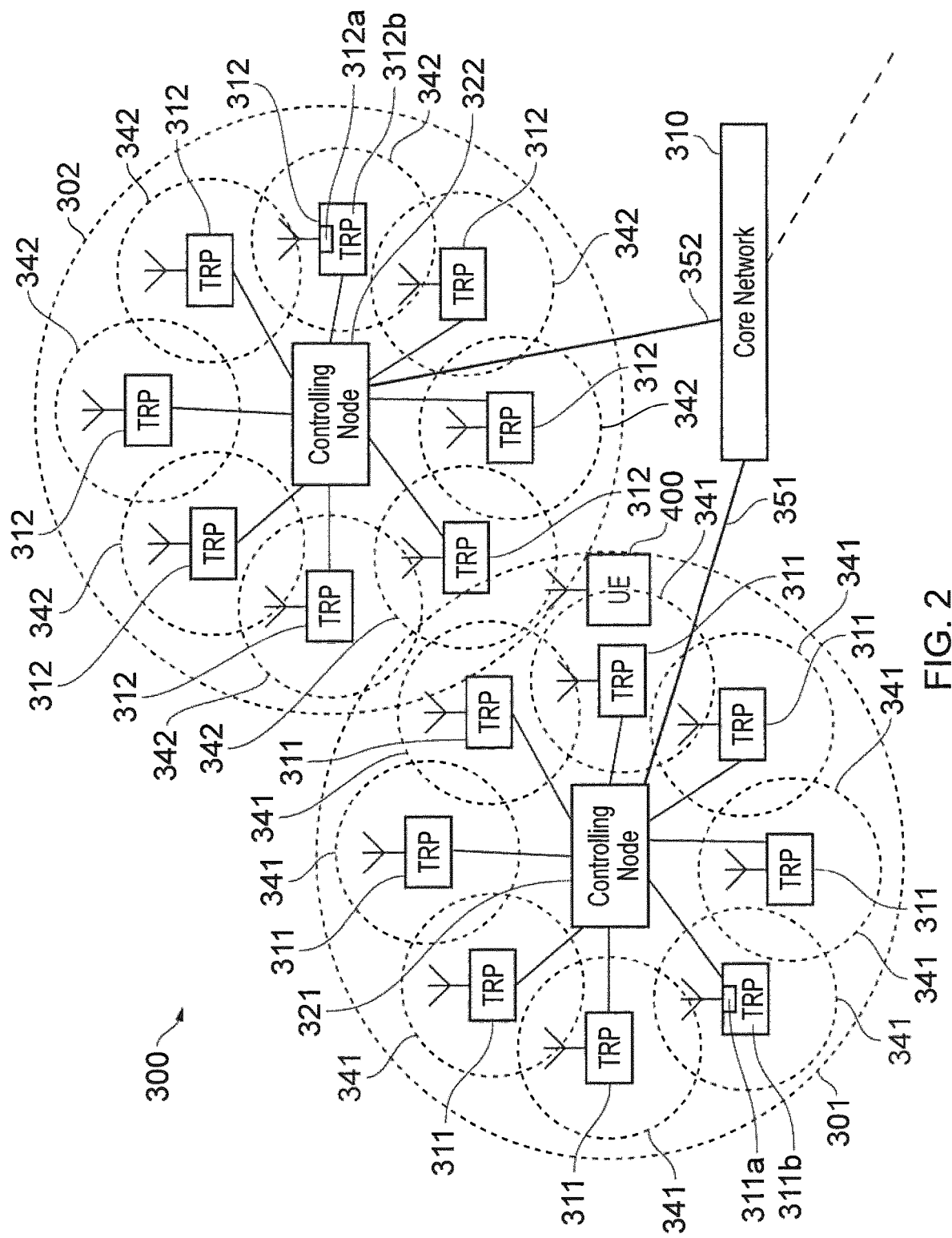
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry 311a, 312a for transmission and reception of wireless signals and processor circuitry 311b, 312b configured to control the respective distributed units 311, 312.

In terms of broad top-level functionality, the core network component 310 of the telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2, and indeed in networks supporting aspects of different architectures in parallel, for example with co-existence of a legacy radio access network architecture, e.g., as schematically represented in FIG. 1, with a new RAT architecture, e.g., as schematically represented in FIG. 2. It will be appreciated the specific wireless telecommunications architecture in any given implementation is not of primary significance to the principles described herein. In this regard, certain embodiments of the disclosure may be described generally in the context of communications between network infrastructure equipment/access nodes and terminal devices, wherein the specific nature of the network infrastructure equipment/access nodes and terminal devices will depend on the specific network infrastructure for the implementation at hand. For example, in some scenarios the network infrastructure equipment/access nodes may comprise base stations, such as LTE-type base stations 101 as shown in FIG. 1, which are adapted to provide functionality in accordance with the principles described herein, and in other examples the network infrastructure equipment may comprise control units/controlling nodes 321, 322 and/or TRPs 311, 312 of the kind shown in FIG. 2 which are adapted to provide functionality in accordance with the principles described herein, and in yet other scenarios the network infrastructure equipment/access nodes may comprise both base stations, such as LTE-type base stations 101 as shown in FIG. 1 and control units/controlling nodes 321, 322 and/or TRPs 311, 312 of the kind shown in FIG. 2 with at least one being adapted to provide functionality in accordance with the principles described herein.

As discussed above, mobile communications networks such the network 100 shown in FIG. 1 and the network 300 shown in FIG. 2 may support services with different characteristics, including services for which reliability, i.e. ensuring a high chance data can be successfully transmitted through the network, is a primary consideration, e.g., for URLLC. Certain embodiments of the disclosure propose approaches that seek to help support the reliability of transmissions in a communications networks and may in particular be described in the context of URLLC data, but it will be appreciated that while the more stringent requirements associated with new types of data in wireless telecommunications systems may be seen as a driver for improving reliability, an improvement in reliability can be beneficial for any type of data for transmission in wireless telecommunications systems, whether classified as URLLC or similar data or otherwise.

It has previously been proposed for wireless telecommunications systems to support so-called dual connectivity which allows for a terminal device to be simultaneously connected to two radio access nodes/network infrastructure equipment. The concept of dual connectivity (DC) was introduced in Release 12 of the 3GPP standard governing the LTE architectures and it is expected corresponding functionality will also be provided in new RAT (NR) networks. In dual connectivity, network access nodes are specified as being either master network access nodes or secondary network access nodes, and user equipment can connect to the network through both master and secondary network access nodes at the same time. Dual connectivity has been previously proposed to enable sharing and combining of resources belonging to different network access nodes, and it has also been proposed to use dual connectivity to support make-before-break handover procedures, and more recently it has been suggested dual connectivity may be used to help introduce support redundancy, and the inventors have recognised how dual connectivity approaches can be developed to seek to further help improve reliability in a wireless telecommunications network.

Figure 3:
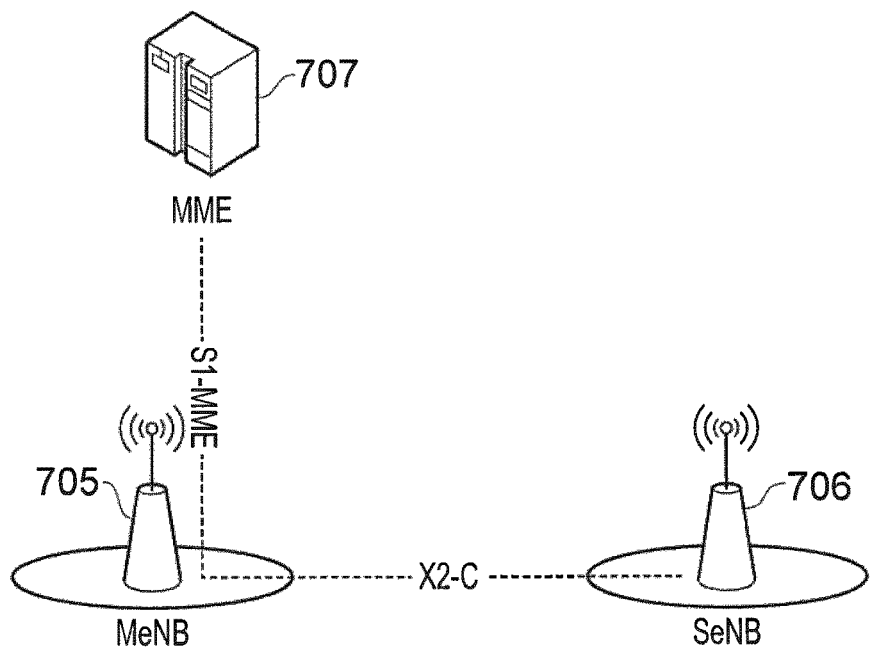
FIG. 3 shows a schematic representation of an example control plane architecture for dual connectivity in a wireless telecommunication network.

FIG. 3 shows a schematic representation of an example control plane architecture for conventional dual connectivity. A master network access node 705 (designated MeNB) and a secondary network access node 706 (designated SeNB) communicate via a control plane using X2-C layer protocol. Communication with the core network in the form of a mobility management entity 707 (MME) via an S1-MME protocol layer terminates in the MeNB 705. It will be appreciated the use of terms such as "MeNB" and "SeNB" here, which are currently widely used in relation to current dual connectivity proposals, should not be interpreted as in any way restricting the approaches described herein to any specific generation of network architecture, but rather are used here purely for convenience of terminology, it being understood that the terms are used to refer to elements of a wireless telecommunications systems having corresponding functionality, regardless of the underlying network architecture. For example, the terms MeNB and SeNB may be used in relation to NR networks, in which corresponding terms such as MgNB and SgNB might also sometimes be used. More generally, for certain embodiments of the disclosure described herein the terms MN (master node) and SN (secondary node) may be used, only the MN being designated for radio resource control (RRC) handling.

Figure 4A:
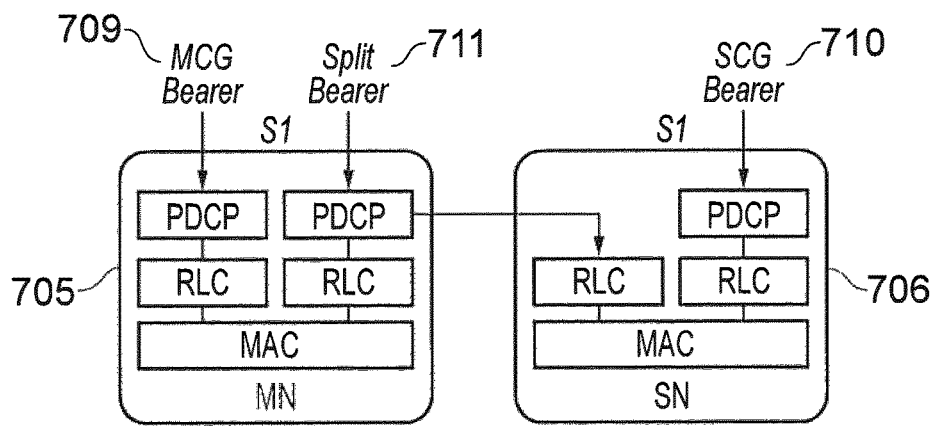
FIG. 4A shows a schematic representation of an example user plane protocol stack for a dual connectivity arrangement in a wireless telecommunication network.

FIG. 4A shows a schematic representation of an example user plane protocol stack for a dual connectivity arrangement. Typically, incoming data arrives via a bearer and is handled by the various protocol layers defined within the network architecture. Once master and secondary eNBs/nodes are defined and grouped in dual connectivity, one can further designate a bearer intended for the MN 705 as a master cell group bearer, MCG bearer 709, and a bearer intended for the SN 706 as a secondary cell group bearer, SCG bearer 710. Data associated with a bearer arrives via the Si protocol layer, is handled by the eNB by, in turn, a packet data convergence protocol (PDCP), then a radio link control (RLC) protocol, and then the medium access control (MAC) layer. As shown in FIG. 4A, each node 705, 706 has these layers to handle received data associated with the bearers.

In addition to the MCG bearer and the SCG bearer, dual connectivity defines a third, split bearer, for the purpose of sharing resources in the MN and the SN on the network side of the telecommunications system. A split bearer 711 is delivered to a PDCP in the MN 705, and the MN 705, at the PDCP, then controls a split or division of the split bearer's data between the MN 705 and the SN 706. Data for the MN 705 is passed to the MN's RLC and then its MAC, and data for the SN 706 is passed from the MN 705, using the X2 protocol layer, to an RLC in the SN and then to the MAC of the SN. After processing by the respective MAC entities, the data is passed to a physical layer (PHY) within the respective entities (not shown in FIG. 4A) for transmission to the terminal device.

Figure 4B:
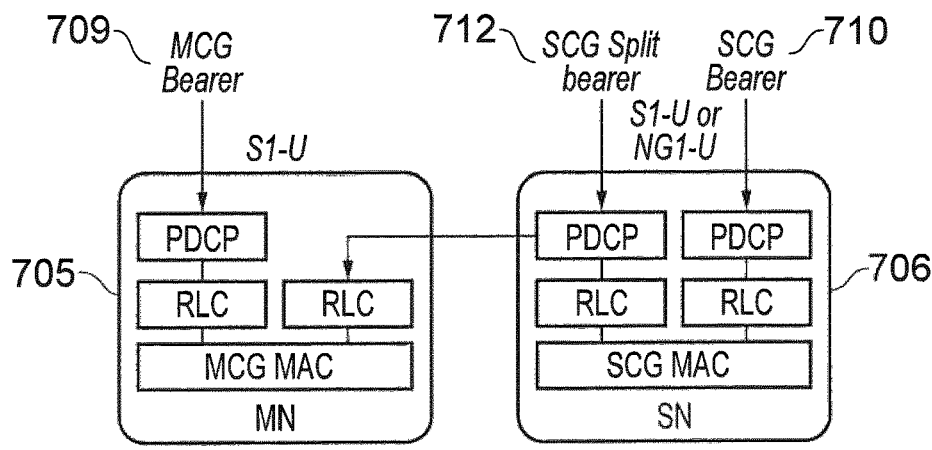
FIG. 4B shows a schematic representation of another example user plane protocol stack for a dual connectivity arrangement in a wireless telecommunication network.

FIG. 4B shows a schematic representation of an example user plane protocol stack utilising a SCG split bearer. As in FIG. 4A, a master node 705 and a secondary node 706 each receive their designated bearers, MCG bearer 709 and SCG bearer 710 respectively, and these are handled by a PCDP, a RLC and a MAC layer, as before. No split bearer of the type shown in FIG. 4A is included, however. Instead there is a SCG split bearer 712 which is delivered to the SN 706. A PDCP in the SN 706 receives the SCG split bearer 712 and divides the data. Some is retained in the SN, being passed to the RLC and MAC layers. Other data is passed from the SN 706 to the MN 705 via an X2 protocol, and the MN 705 handles it with its own RLC and MAC resources. As in FIG. 4A, after processing by the respective MAC entities, the data is passed to a physical layer (PHY) within the respective entities (not shown in FIG. 4B) for transmission to the terminal device.

Conventionally, there may be provided signalling radio bearers (SRBs) for the transmission of signalling messages between the terminal device 208 and one or both of the MN 204 and SN 206. In particular, the following SRBs may be defined [7]:
  SRB0 for RRC messages using a common control channel (CCCH) logical channel;
  SRB1 for RRC messages (which may include a piggybacked NAS message) as well as for NAS messages prior to the establishment of SRB2, all using a dedicated control channel (DCCH) logical channel;
  SRB2 is for NAS messages, all using DCCH logical channel. SRB2 has a lower-priority than SRB1 and is always configured by the network after security activation; and
  SRB3 is for specific RRC messages when the terminal device 208 is in Evolved Universal Terrestrial Radio Access (E-UTRA) NR Dual Connectivity (EN-DC), all using DCCH logical channel.

Although there may be an RRC entity in both the MN and the SN, a terminal device in dual configuration has a single RRC entity. RRC messages can be sent using signalling radio bearers SRB1 and SRB2 to the MN and using SRB3 to the SN. SRBs may use protocol entities in either MN or SN. For terminal devices configured for dual connectivity and split bearer transport, user traffic from the core network can be received at the MN as a split bearer, and then divided between the MN and the SN for handling and passing to the terminal device (user equipment/UE). Any traffic on a SCG bearer is received from the core network at the SN and transported using resources of the SN to the UE.

Further details regarding existing dual connectivity proposals can be found, for example, in 3GPP TS 36.300 version 13.2.0 Release 13 (2016-01) [5] (in particular Section 6.5).

Figure 5:
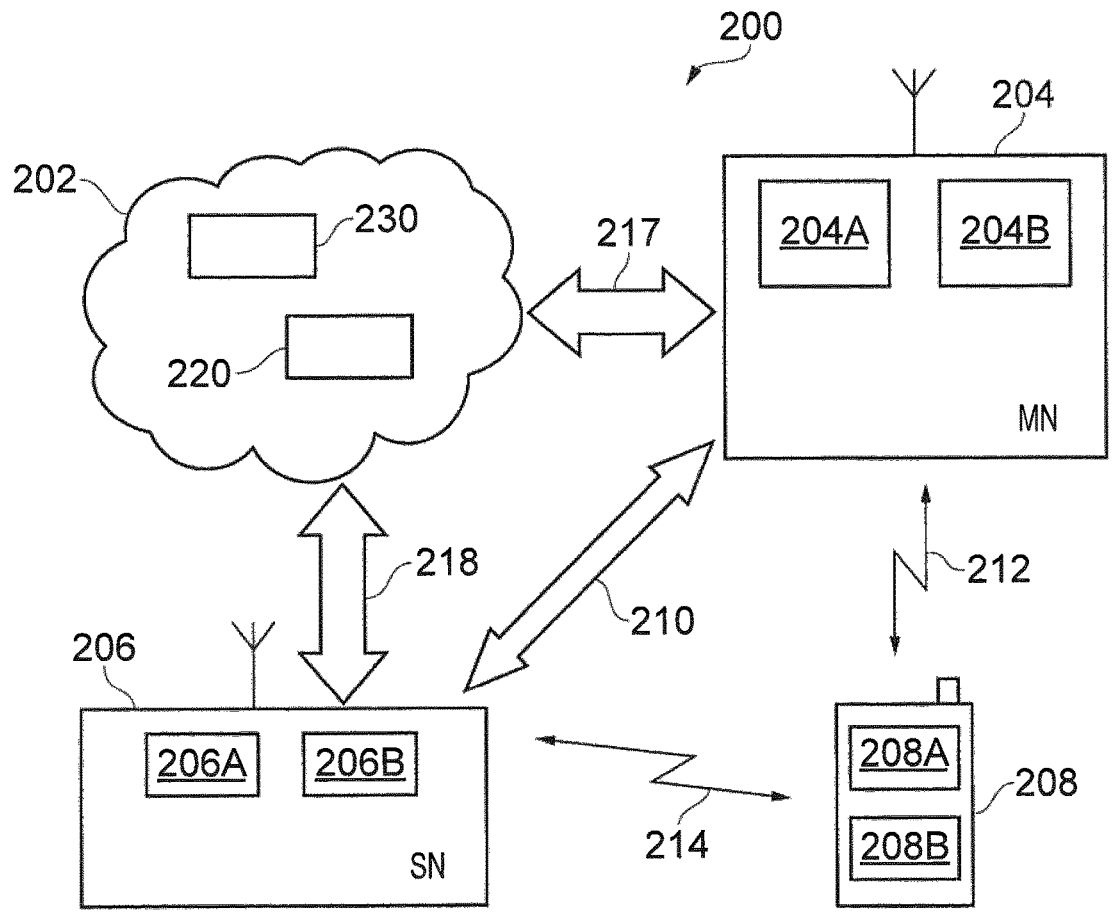
FIGS. 5 schematically represents some aspects of a wireless telecommunication network in accordance with certain embodiments of the disclosure.

FIG. 5 schematically represents some aspects of a wireless telecommunications system 200 configured to operate to support dual connectivity for a terminal device 208 with a first, or master, network access node (MN) 204 and a second, or secondary, network access node (SN) 206 to seek to help increase reliability of data transmissions in the wireless telecommunications system 200 in accordance with certain embodiments of the disclosure. Aspects of the architecture and operation of the telecommunications system 200 which are not specifically described herein may be implemented in accordance with any previously proposed techniques, for example according to current 3GPP standards and other proposals for operating wireless telecommunications systems/networks. The network access nodes 204, 206 may, for convenience, sometimes be referred to herein as base stations 204, 206, it being understood this term is used for simplicity and is not intended to imply the network access nodes should conform to any specific network architecture, but on the contrary, these elements may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 200 comprises a core network part 202 coupled to a radio network part. The radio network part comprises the master network access node 204, the secondary network access node 206, and the terminal device 208. In this example, two network access nodes 204, 206 and one terminal device 208 are shown for simplicity, but it will of course be appreciated that in practice the radio network part may comprise a larger number of network access nodes serving a larger number of terminal devices across various communication cells.

In accordance with proposed dual connectivity approaches the terminal device 208 is simultaneously connected to, and able to communicate data with, both the master and secondary network access nodes (base stations/transceiver stations) 204, 206. The network access nodes 204, 206 are communicatively connected via respective communication links 217, 218 to a core network part such as the core network part 202, and in particular to a user plane function, UPF, 230 in the core network part 202 arranged to perform routing and management of mobile communications services to the terminal devices in the telecommunications system 200 via the network access nodes 204, 206. In order to maintain mobility management and connectivity, the core network part 202 also includes an Access and Mobility Management Function (AMF), 220 which manages the connections with the terminal device 208 operating in the communications system based on subscriber information stored in a home subscriber server, HSS. Other network components in the core network in this example implementation (not shown for simplicity) may include a policy charging and remaster function, PCRF, and a packet data network gateway, PDN-GW, which provides a connection from the core network part 202 to an external packet data network, for example the Internet. As noted above, the operation of the various elements of the communications system 200 shown in FIG. 5 may be broadly conventional apart from where modified to provide functionality in accordance with embodiments of the present disclosure as discussed herein.

The master network infrastructure element/access node 204 comprises transceiver circuitry 204a (which may also be referred to as a transceiver/transceiver unit) for transmission and reception of wireless signals and processor circuitry 204b (which may also be referred to as a processor/processor unit) configured to control the master network infrastructure element 204 to operate in accordance with embodiments of the present disclosure as described herein. The processor circuitry 204b may comprise various sub-units for providing functionality in accordance with embodiments of the present disclosure as explained further herein. These sub-units may be implemented as discrete hardware elements or as appropriately configured functions of the processor circuitry. Thus, the processor circuitry 204b may comprise circuitry which is suitably configured/programmed to provide the desired functionality described herein using conventional programming/configuration techniques for equipment in wireless telecommunications systems. The transceiver circuitry 204a and the processor circuitry 204b are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the master network infrastructure element 204 will in general comprise various other elements associated with its operating functionality, such as a scheduler. For example, although not shown in FIG. 5 for simplicity, the processor circuitry 204b may comprise scheduling circuitry, that is to say the processor circuitry 204b may be configured/programmed to provide a scheduling function for the master network infrastructure element 204.

The secondary network infrastructure element/access node 206 is in general similar to the master network infrastructure element/access node 206 and also comprises transceiver circuitry 206a (transceiver/transceiver unit) for transmission and reception of wireless signals and processor circuitry 206b (processor/processor unit) configured to control the secondary network infrastructure element 206 to operate in accordance with embodiments of the present disclosure as described herein. The processor circuitry 206b may comprise various sub-units for providing functionality in accordance with embodiments of the present disclosure as explained further herein. These sub-units may be implemented as discrete hardware elements or as appropriately configured functions of the processor circuitry. Thus, the processor circuitry 206b may comprise circuitry which is suitably configured/programmed to provide the desired functionality described herein using conventional programming/configuration techniques for equipment in wireless telecommunications systems. The transceiver circuitry 206a and the processor circuitry 206b are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). For example, although not shown in FIG. 5 for simplicity, the processor circuitry 206b may comprise scheduling circuitry, that is to say the processor circuitry 206b may be configured/programmed to provide the scheduling function for the secondary network infrastructure element 206.

The terminal device 208 is adapted to support operations in accordance with embodiments of the present disclosure when communicating with the network access nodes 204, 206. The terminal device 208 comprises transceiver circuitry 208a (which may also be referred to as a transceiver/transceiver unit) for transmission and reception of wireless signals and processor circuitry 208b (which may also be referred to as a processor/processor unit) configured to control the terminal device 208. The processor circuitry 208b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 208b may comprise circuitry which is suitably configured/programmed to provide the desired functionality described herein using conventional programming/configuration techniques for equipment in wireless telecommunications systems. The transceiver circuitry 208a and the processor circuitry 208b are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 208 will in general comprise various other elements associated with its operating functionality, for example a power master, user interface, and so forth, but these are not shown in FIG. 5 in the interests of simplicity.

Figure 6:
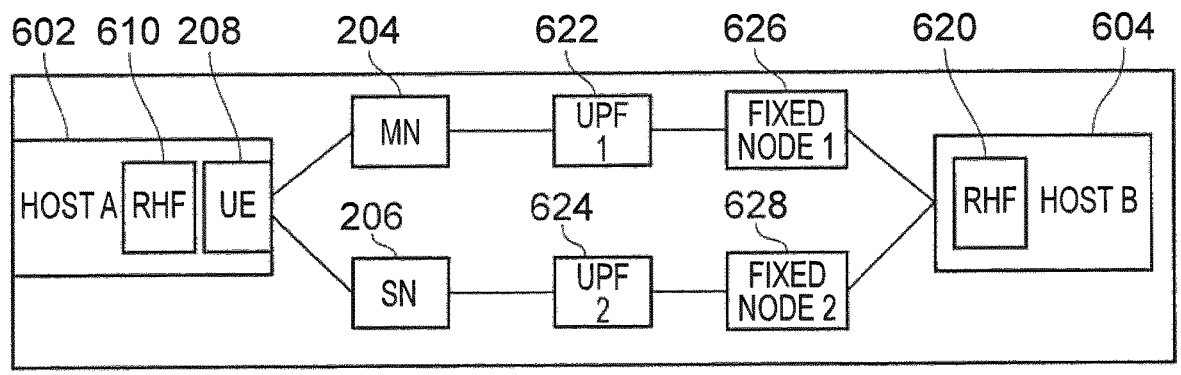
FIGS. 6 schematically represents some aspects of a dual connective approach for providing redundancy in a wireless telecommunication network in accordance with certain embodiments of the disclosure.

As noted above, the inventors have recognised how dual connectivity approaches for introducing redundancy can be adapted to seek to help further improve reliability in wireless telecommunications systems. FIG. 6 schematically represents a scenario in which dual connectivity may be used to support enhanced reliability of data transfer from a first host node 602 (Host A) associated with the terminal device (UE) 208 to a second host node 604 (Host B), for example associated with an applications server for the data being communicated with the terminal device 208, in accordance with certain embodiments of the disclosure. Thus FIG. 6 schematically represents two separate paths for communicating data between the terminal device 208 and the host B 604 through the wireless telecommunications system 200 with one path being via the master node 204 and one path being via the secondary node 206, wherein the master node may be an LTE or NR master eNB/gNB and the secondary node may be a secondary eNB/gNB providing dual connectivity. The same data may be communicated over both paths to provide redundancy to seek to improve reliability, for example in the expectation communications may continue over one path in the event of radio interference disrupting communications over the other path.

Thus to provide for duplication/redundancy, the RHF (redundancy handling functions) 610, 620 in the respective host nodes 602, 604 establish two PDU sessions, one being an MCG bearer and another being an SCG bearer, which carry the same data. The specific implementation of the RHF functions in the respective hosts is not significant and may depend on implementation. Thus the MCG bearer is associated with a first communications path via the master node 204, a first user plane function UPF1 622 (which may broadly correspond to the UPF 230 of FIG. 5) and a first fixed node 626 while the SCG bearer is associated with a second communications path via the secondary node 206, a second user plane function UPF2 624 and a second fixed node 628.

Proposed dual connectivity approaches for EN-DC (evolved universal terrestrial radio access new radio dual connectivity) and MR-DC (multi-radio access technology dual connectivity) have been established on the assumption that the MCG or MeNB/MN cell is a macro cell and the SCG or SeNB/SN cell is a small cell within the Macro/MN cell. Since the macro/MN cell coverage is ubiquitous, all RRC (radio resource control) procedures including security and RLM/RLF (radio link monitoring/radio link failure) procedures are centred in and controlled by the master node MN. In these configurations SRB3 (signalling radio bearer 3) is provided as a supplementary SRB. When SRB1 is split then RRC messages are still generated by the master node, but the user plane protocol stacks from both the MN and SN can be used.

In accordance with embodiments of the present technique, in some scenarios the second UPF2 624 may be the same as the first UPF2 622 (both may, for example, correspond to the UPF 230 of FIG. 5). In some embodiments, on the other hand, the second UPF2 624 may be different from the first UPF2 622, as shown in FIG. 6.

In accordance with current proposals (see 3GPP TS 37.340 version 15.3.0 Release 15 (2018-09) [6] for more details), a decision to establish SRB3 is taken by the SN, which provides the SRB3 configuration using an SN RRC message. SRB3 establishment and release can be done at Secondary Node Addition and Secondary Node Change. SRB3 reconfiguration can be done at Secondary Node Modification procedure. SRB3 may be used to send SN RRC Reconfiguration, SN RRC Reconfiguration Complete and SN Measurement Report messages, only in procedures where the MN is not involved. SN RRC Reconfiguration Complete messages are mapped to the same SRB as the message initiating the procedure. SN Measurement Report messages are mapped to SRB3, if configured, regardless of whether the configuration is received directly from the SN or via the MN. No MN RRC messages are mapped to SRB3. SRB3 is modelled as one of the SRBs defined in 3GPP TS 38.331 version 15.3.0 Release 15 (2018-09) [7] and uses the new radio (NR) dedicated control channel (DCCH), NR-DCCH, logical channel type. RRC PDUs on SRB3 are ciphered and integrity protected using NR PDCP, with security keys derived from S-KgNB. The SN selects ciphering and integrity protection algorithms for the SRB3 and provides them to the MN within the SCG Configuration for transmission to the UE. A NR SCG RRC message sent via E-UTRA MCG SRB is protected by E-UTRA MCG SRB security (NR security is not used in this case). SRB3 is of higher scheduling priority than all data radio bearers (DRBs). The default scheduling priorities of split SRB1 and SRB3 are the same. There is no requirement on the UE to perform any reordering of RRC messages between SRB1 and SRB3. When SCG is released, SRB3 is released.

As a consequence of the current approaches for dual connectivity, if the communication path through the master node 204 in FIG. 6 fails, the communication path through the secondary node 206 cannot provide full redundancy in accordance with existing proposals for dual connectivity because the communication path through the secondary node 206 cannot properly support independent RRC signalling. However, when using the dual connectivity approach represented in FIG. 6 to provide redundancy, for example for URLLC data, SRB3 or SRB over SN support is no longer only supplementary in nature, but needs to support some functions of SRB1/2.

Thus in accordance with current approaches for dual connectivity, if the MN connection is lost, the terminal device determines that RLF (radio link failure) has occurred and performs re-establishment. Even if the SN connection still has good radio conditions, it is currently removed if the MN connection fails. Even if the current approaches for dual connectivity are modified to maintain the SN connection on failed MN connection, the inventors have recognised that some issues still remain, for example in relation to NAS signalling, RRC connection re-establishment and RRC resume.

RRC Connection Re-Establishment

RRC Re-establishment may be triggered by a terminal device such as the terminal device 208, which is in RRC Connected mode and has an RRC connection for which security has been activated, in response to a determination of a radio link failure (RLF). The radio link failure may be determined to have occurred (in other words, determined to have been detected) if radio link measurements for the MN 204 satisfy one or more pre-determined radio link failure criteria. According to conventional techniques, in a dual connectivity scenario, the terminal device may determine that radio link failure has occurred based on the RLF criteria being satisfied in respect of the MN 204, and irrespective of the quality of the radio link between the terminal device and the SN 206. RLF may also be determined to have occurred based on additional criteria, such as in response to a mobility procedure failure, integrity failure on SRB1 or SRB2, or a failure of an RRC reconfiguration procedure.

After determining that RLF has occurred, the terminal device 208 may release all MCG SCells, suspend all radio bearers except SRB0, and perform a cell selection procedure to select a suitable cell. The terminal device 208 may then initiate a random access procedure in the new cell, to obtain an allocation of uplink resources, and may then transmit the RRC Re-establishment request message to the gNB of the new cell, using the allocated uplink resources on a CCCH/SRB0.

The RRC Re-establishment request message may comprise an authentication token such as a shortMAC-I which may be calculated based on parameters used for the transmission of data in the MN 204 prior to the determination of RLF. Examples of such parameters include the cell radio network temporary identity (C-RNTI) and a source physical cell identity. The authentication token may be calculated using a security key, such as a KgNB, applicable (e.g. used for the encryption of transmitted data) in the cell controlled by the MN 204 prior to the determination of RLF.

If the gNB which controls the selected cell does not have, or is unable to obtain, a stored context for the terminal device and is therefore unable to verify the contents of the RRC Re-establishment request, the procedure may fall back to a conventional RRC connection establishment procedure, in which all current radio bearers are first released. In an NR radio access network, the gNB may in such circumstances transmit an RRC Setup message to the terminal device.

It has been proposed that the criteria for RLF determination by a terminal device in dual connectivity be adapted such that the radio link between the SN 206 and the terminal device 204 also be taken into account. In particular, it has been proposed that RLF should not be determined unless criteria relating to both the radio link between the SN 206 and the terminal device 208 and the radio link between the MN 204 and the terminal device 208 are satisfied. The effect of such a proposal would be to permit the terminal device 208 to continue communicating with the SN 206, even if the radio link quality for transmissions between the terminal device 208 and the MN 204 are poor (and would have otherwise triggered an RLF determination).

A re-establishment attempt which occurs in any cell other than that corresponding to the MN 204 will incur delay during the re-establishment process, resulting in increased latency for data which is queued for transmission at or after the time at which RLF is determined to have occurred. It is thus desirable to be able to reduce this delay.

According to embodiments of the present technique, a radio access node other than the MN 204 which receives an RRC re-establishment request from the terminal device 208 responds without, in response to receiving the request, requesting or receiving a context for the terminal device 208. The RRC re-establishment request comprises parameters which match those in a context which is stored by the receiving radio access node at the time when the request is received and which is associated with the terminal device 208.

The stored context may comprise parameters used for the communication of data between the terminal device 208 and the MN 204 and/or for the communication of data between the terminal device 208 and the SN 206, prior to the determination of RLF.

According to some embodiments of the present technique, the latency for completing an RRC re-establishment procedure may be significantly decreased, because the retrieval of the context associated with the terminal device from the former MN, prior to the former SN transmitting a message to the terminal device allowing the terminal to resume the RRC connection, can be avoided.

Figure 7:
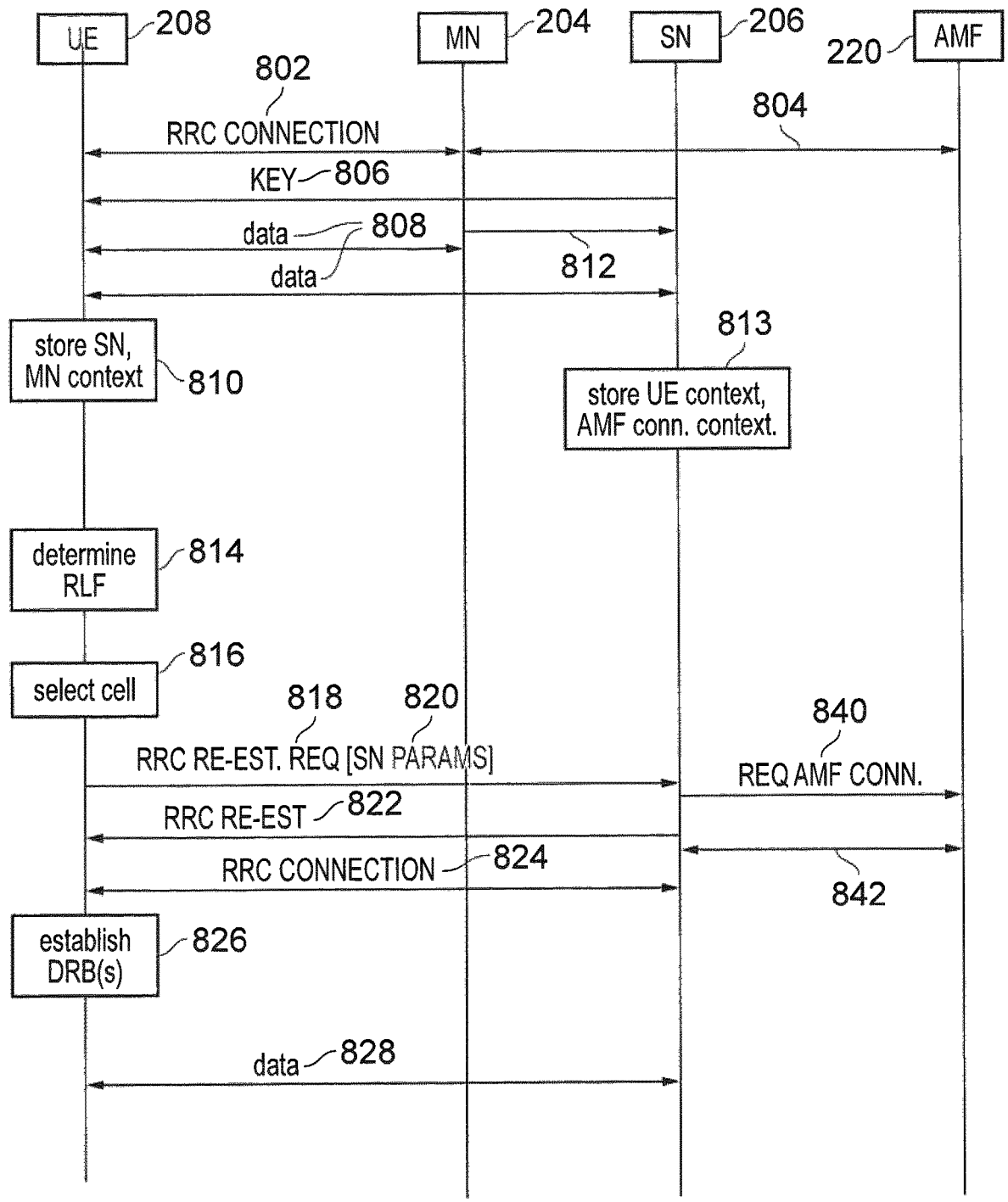
FIG. 7 shows a message sequence chart for a radio resource control (RRC) Re-establishment procedure in accordance with embodiments of the present technique.

FIG. 7 shows a message sequence chart for an RRC Re-establishment procedure in accordance with embodiments of the present technique.

Initially the terminal device 208 establishes an RRC connection 802 with the MN 204, and the MN 204 establishes a control plane connection 804 with the AMF 220. Subsequently, or at the same time, the terminal device 208 enters the dual connectivity mode of operation in which it is able to transmit data via both the MN 204 and via the SN 206, and to similarly receive data transmitted by the MN 204 and the SN 206. In order to support the communication of data with the SN 206 the SN 206 may transmit a security key 806 to the terminal device 208 directly (as shown in FIG. 7) or indirectly via the MN 204.

It will be apparent that other steps may occur and other control information transmissions may take place in order for the terminal device 208 to be established in the dual connectivity mode of operation, however these are omitted for conciseness.

In order to support the communication of data between the MN 204 and the terminal device 208, the MN 204 may maintain state information which is specific to the terminal device 208. The state information maintained at a radio access node such as the MN 204 may be referred to as a UE context.

The UE context maintained at the MN 204 may include one or more of security parameters, terminal device identification numbers used in the cell associated with the MN 204, an identity of the cell controlled by the MN 204 in which the terminal device 208 is currently obtaining service, current radio configuration, full or partial set of capabilities of the terminal device 208, security algorithms supported by the terminal device 208, and features currently configured. In some embodiments, the security parameters may be derived from an encryption key and/or an integrity key used for the transmission of data between the terminal device 208 and the MN 204. In some embodiments, the security parameters may be subsequently used to derive an encryption key and/or an integrity key for use for the transmission of data after the RRC re-establishment.

Similarly, in order to support the communication of data between the SN 206 and the terminal device 208, the SN 206 may maintain state information which is specific to the terminal device 208. The state information, or UE context, maintained at the SN 206 may include one or more of security parameters, terminal device identification numbers used in the cell associated with the SN 204, an identity of the cell controlled by the SN 206 in which the terminal device 208 is currently obtaining service, current radio configuration, full or partial set of capabilities of the terminal device 208, security algorithms supported by the terminal device 208, and features currently configured.

Since the MN 204 is the master node and managing the connection with the core network for the terminal device 208, the UE context stored at the MN may be bigger in size than the UE context stored at the SN 206. In some embodiments, the UE context maintained at the SN 206 may include fewer parameters than that stored at the MN 204. For example, the UE context stored at the MN 204 may include state information based on measurements results transmitted by the terminal device 208 to the MN 204 comprising indications of one or more measurements of the radio link between the terminal device 208 and the MN 204. The UE context maintained at the SN 206 may comprise a subset of the UE context maintained at the MN 204.

Differences between the UE context stored at the MN 204 and the UE context stored at the SN 206 may arise, for example, because the MN 204 will receive full UE capabilities while the SN 206 may know only part of UE capabilities. Some radio resource management (RRM) measurements may be reported to the MN 204 only. There may be other features activated in the terminal device 208 which relate to communications with the MN 204 which the SN 206 may or may not be aware of. Similarly, the SN 206 may activate features for the terminal device 208 which the MN 204 may not have any knowledge. In general, however, it may be that the number of features enabled by the SN 206 may be few compared to those relevant to the MN 204.

In some embodiments, the UE contexts maintained at the SN 206 and the MN 204 may be in accordance with conventional techniques for establishing and providing a dual connectivity mode of operation for the terminal device 208.

While the terminal device 208 is in the dual connectivity mode it similarly maintains 810 state information associated with, and/or to support, the communication of data between the terminal device 208 and the MN 204 (which may be referred to as an MN context), and associated with, and/or to support, the communication of data between the terminal device 208 and the SN 206, which may be referred to as an SN context.

In FIG. 7, step 810 is shown as occurring after the transmission of data 808, however it will be readily apparent that the storage of context by the terminal device 208 may be ongoing, and may start, for example, in response to the establishment of the RRC connection 802 and/or the establishment of the dual connectivity mode of operation.

For example, the SN context may comprise one or more of a physical cell identity for the cell controlled by the SN 206, a C-RNTI associated with the terminal device 208 in the cell, and one or more security parameters, such as an encryption key and/or an integrity key. In some embodiments, the security parameters may be derived from an encryption key and/or an integrity key. In some embodiments, the security parameters may be subsequently used to derive an encryption key and/or an integrity key for use after the RRC re-establishment.

The MN context may comprise one or more of a physical cell identity for the cell controlled by the MN 204, a C-RNTI associated with the terminal device 208 in the cell, and one or more security parameters, such as an encryption key and/or an integrity key.

The SN context may, in addition or alternatively, comprise parameters associated with one or more radio bearers and/or parameters set by the SN 206 for controlling the transmission and/or reception of the data 808.

In some embodiments, the MN context and SN context stored at the UE may be in accordance with conventional techniques for establishing and providing a dual connectivity mode of operation for the terminal device 208.

According to some embodiments of the present technique the dual connectivity mode of operation may provide redundancy if the data communicated with the MN 204 is the same as the data communicated with the SN 206.

In some embodiments, the MN 204 may transmit an MN UE context information message 812 to the SN 206. The MN UE context information message 812 may provide parameters associated with the connection 804 between the MN 204 and the AMF 220. In some embodiments, the MN UE context information message 812 comprises a connection identifier which identifies the control plane connection 804.

In some embodiments, the MN UE context information message 812 may further comprise parameters or other information based on the UE context stored by the MN 204 as described above. In some embodiments, the MN UE context information message 812 may comprise a subset of the UE context stored by the MN 204. The MN UE context information message 812 may contain sufficient information to permit a subsequent RRC Re-establishment procedure between the terminal device 208 and the SN 206, wherein the SN 206 has sufficient context information regarding the terminal device 208 that it is not necessary for the SN 206 to request or receive information specific to the terminal device 208 from the MN 204.

In some embodiments the MN UE context information message 812 may comprise one or more of security parameters, terminal device identification numbers used in the cell associated with the MN 204, an identity of the cell controlled by the MN 204.

Subsequently at 814 the terminal device 208 may determine that radio link failure criteria have been satisfied in respect of both the communications with the MN 204 and the communications with the SN 206. Radio link failure may be determined based on measurements of downlink signals transmitted by the MN 204 and the SN 206 and/or based on other criteria. The RLF criteria may in some embodiments correspond to conventional criteria such as those described above. In response to the detection that the RLF criteria have been satisfied, then the terminal device 208 selects 816 a cell for performing RRC Connection Re-establishment. In the example shown in FIG. 7 the terminal device 208 selects a cell controlled by the SN 206.

In some embodiments, the SN 206 may also determine that RLF criteria for the terminal device 208 have been satisfied. Nevertheless, the SN 206 stores a context associated with the terminal device 208, which may comprise parameters used for the transmission of data to or by the terminal device 208 by or to the SN 206 as well as parameters associated with the terminal device received from the MN 204 in the MN UE context information message 812.

It will be appreciated that at this stage in the process the MN 204 and the SN 206 may no longer fulfil the roles of MN and SN respectively, since the terminal device 208 is no longer communicating data with either the MN 204 or the SN 206. However, for clarity and convenience, these radio access nodes will continue to be referred to as the MN 204 and the SN 206 respectively.

In response to the cell selection 816, the terminal device 208 transmits an RRC Re-establishment request 818 in which it provides one or more parameters 820 to indicate the identity of the terminal device 208 and, in some embodiments, to allow the SN 206 to verify the identity of the terminal device 208. In the example of FIG. 7 the RRC Re-establishment request 818 comprises values which are based on the stored SN context. As such, the SN 206 having stored previously a context associated with the terminal device 208 while the terminal device 208 was in the dual connectivity mode, is able to identify the terminal device 208 and to confirm the authenticity of the RRC Re-establishment request 818, based on the parameters 820 contained within the RRC Re-establishment request.

In response to receiving the RRC Re-establishment request message 818, the SN 206 transmits an RRC Re-establishment message 822 providing parameters to enable to terminal device to re-establish an RRC connection 824 with the SN 206.

In some embodiments the RRC Re-establishment message 822 is an enhanced RRC Re-establishment message providing parameters allowing the terminal device 208, at 826, to establish data radio bearers for the transmission of data 828 as shown in FIG. 7.

In some embodiments, the contents of the RRC Re-establishment message 822 may be based on the contents of the MN UE context information message 812.

In some embodiments the RRC Re-establishment message 822 permits the establishment of the RRC connection 824 but does not permit the establishment 826 of the data radio bearers. In some such embodiments the transmission of the RRC Re-establishment message 822 may be followed by a transmission of an RRC re-configuration message, the RRC re-configuration message comprising parameters for the establishment 826 of the one or more data radio bearers, which is not shown in the example in FIG. 7.

In some embodiments the SN 206, in response to receiving the RRC Re-establishment request message 818, requests the AMF 220 to establish a connection between the AMF 220 and the SN 206 associated with the terminal device 208. Thus in some embodiments the SN 206 transmits a Request AMF Connection message 840 to the AMF 220. The Request AMF Connection message 840 may comprise parameters based on the AMF connection context 812 previously provided by the MN 204. In response to receiving the Request AMF Connection message 840, the AMF 220 may establish a new control plane connection 842 associated with the terminal device 208 between the SN 206 and the AMF 220.

In some embodiments, the new control plane connection 842 corresponds to (e.g. operates according to the same parameters as) the control plane connection 804 previously established between the MN 204 and the AMF 220.

Thus, based on the storage of the terminal device context by the SN 206, and the use of parameters associated with the SN 820 in the RRC Re-establishment request message, embodiments of the present technique provide techniques and apparatus for re-establishing the RRC connection 824 with the SN 206, whereby the SN 206 does not have to request from the MN 204 a context associated with the terminal device 208 in response to receiving the RRC Re-establishment request message 818.

Figure 8:
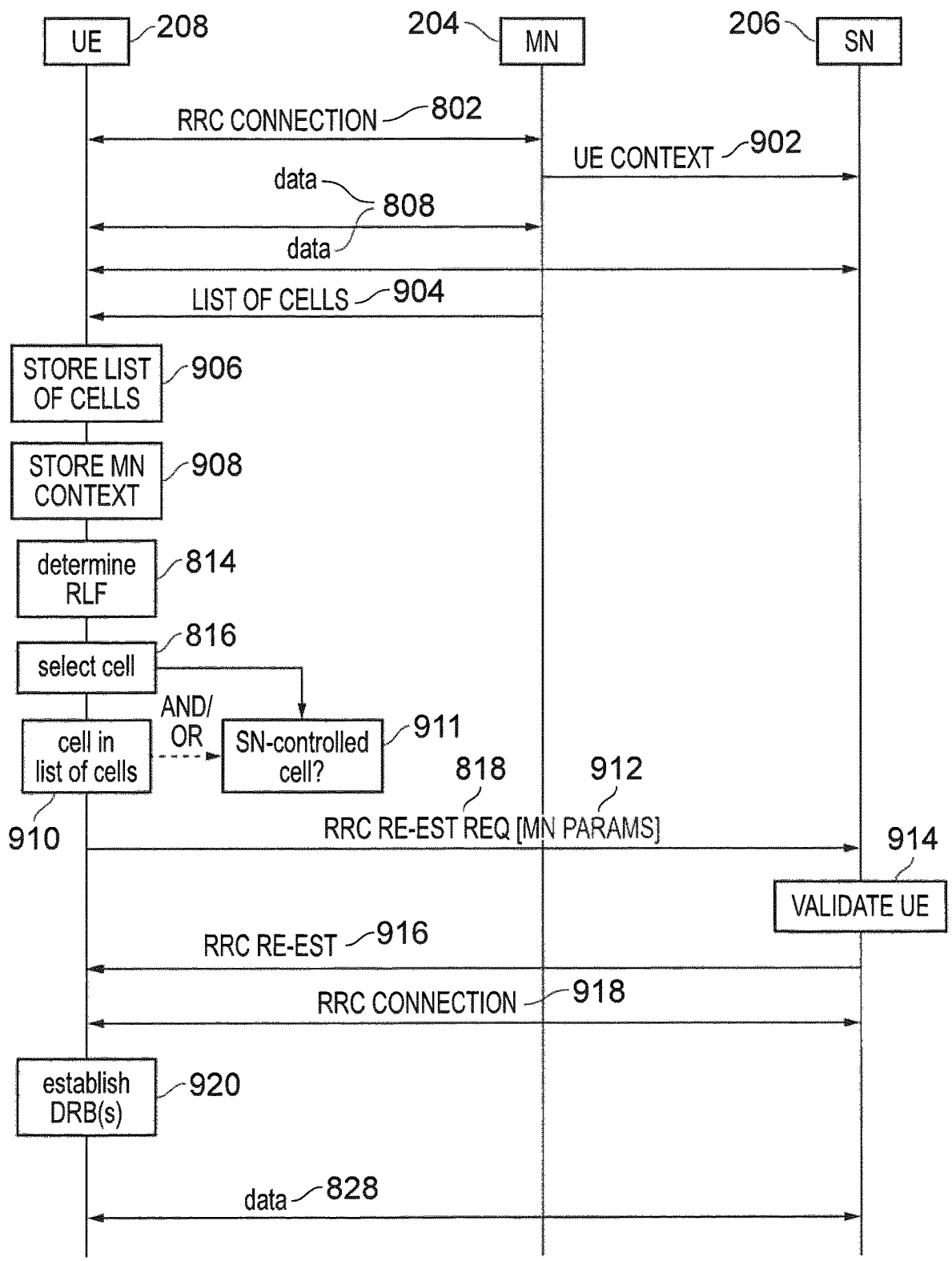
FIG. 8 shows a message sequence chart for a further RRC Re-establishment procedure in accordance with embodiments of the present technique.

FIG. 8 illustrates a message sequence chart for the re-establishment of an RRC connection in accordance with embodiments of the present technique.

Some elements shown in FIG. 8 correspond broadly to elements shown in FIG. 7 having the same reference numerals and their description will be accordingly omitted for conciseness. In addition, interactions with the AMF 220 are omitted for conciseness.

In the example shown in FIG. 8, unlike the example shown in FIG. 7, contents of the RRC Re-establishment request message may be based on parameters used for the communication of the data between the terminal device 208 and the MN 204. In the example of FIG. 8, the SN 206 receives such parameters from the MN 204 associated with the terminal device 208 which allow it to verify the contents of the RRC Re-establishment request.

Thus in the example of FIG. 8 after the establishment of the RRC connection 802 and while the terminal device 208 is in the dual connectivity mode, the MN 204 transmits a UE context 902 to the SN 206. The UE context 902 may include one or more of security parameters, terminal device identification numbers used in the cell associated with the MN 204, an identity of the cell controlled by the MN 204, current radio configuration, full or partial set of capabilities of the terminal device 208, security algorithms supported by the terminal device 208, and features currently configured. In some embodiments, the security parameters may be derived from an encryption key and/or an integrity key used for the transmission of data between the terminal device 208 and the MN 204. In some embodiments, the security parameters may be subsequently used to derive an encryption key and/or an integrity key for use for the transmission of data after the RRC re-establishment.

In some embodiments, the UE context 902 may be a subset of a full UE context stored at the MN 204 and/or a subset of an MN context stored at the terminal device 208 while the terminal device 208 is in dual connectivity.

In some embodiments the MN 204 may additionally or alternatively transmit the UE context 902 to radio access nodes other than the SN 206 such that there may be a plurality of cells in which the RRC Re-establishment, in accordance with embodiments of the present technique, can take place. That is to say the UE context 902 may be transferred not only to the SN 206 as shown in FIG. 8 but to other access nodes, not shown in FIG. 8.

In some embodiments, based on the set of radio access nodes to which the UE context 902 has been transmitted, the MN 204 forms a list of cells 904 associated with the radio access nodes which have received the UE context 902. The list of cells 904 may be transmitted by the MN 204 to the terminal device 208 while the terminal device 208 is in the dual connectivity mode.

In response to receiving the list of cells 904, the terminal device 208 stores at 906 the list of cells 904 and at 908 stores an MN context associated with the transmission of data between the MN 204 and the terminal device 208. In some embodiments the MN context stored by the terminal device 208 and the UE context 902 may be the same. In some embodiments, the MN context stored at 908 may be a subset of a full MN context which is stored at the terminal device 208 only while the terminal device 208 is in dual connectivity.

Subsequently, as in the example in FIG. 7, the terminal device 208 may determine at 814 that radio link failure has occurred and that the RRC connection 802 can no longer be used. In response to determining that RLF has occurred, the terminal device 208 selects 816 a cell in which to perform RRC Re-establishment.

In embodiments in which it has received a list of cells 904 it may determine 910 whether the selected cell is within the list of cells 904. Alternatively or additionally it may determine 911 whether the selected cell was configured as part of the SCG when the terminal device 208 was in the dual connectivity mode and prior to the determination of RLF 814. In any case, in the example in FIG. 8, based on the outcome of the determination 910 and/or the determination 911, the terminal device 208 determines that the radio access node controlling the selected cell has stored the UE context 902.

In response to this determination, the terminal device 208 transmits the RRC Re-establishment request message 818. However, unlike the RRC Re-establishment message transmitted in FIG. 7, in the RRC Re-establishment message 818 in the present example the terminal device 208 includes parameters 912 based on the stored MN context, which may be based on parameters associated with the previous communications of the data 808 between the terminal device 208 and the MN 204.

In some embodiments, not shown in FIG. 8, the terminal device 208 may determine that the radio access node controlling the selected cell does not have stored the UE context 902. In response to this determination, the terminal device 208 may initiate an alternate re-establishment procedure, such as a conventional re-establishment procedure.

At step 914, in response to receiving the RRC Re-establishment request 818, the SN 206 validates the request at 912. The validation of the request may be based on the parameters 912 included in the Re-establishment request 818 and the UE context 902 received previously from the MN 204. If the SN 206 is able to confirm the identity of the terminal device 208 based on the parameters 912 then it transmits in response the RRC Re-establishment message 916.

As described above in respect of FIG. 7, in some embodiments the RRC Re-establishment message 916 may provide sufficient parameters to permit the terminal device 208 to both re-establish an RRC connection 918 with the SN 206 and at 920 to establish 920 data radio bearers for the transmission of the data 828 between the terminal device 208 and the SN 206.

In some embodiments, one or more steps may be omitted, and/or steps may be performed in a different order from that shown in the Figures and/or described herein, without departing from the scope of the disclosure.

In some embodiments, steps described as part of one example may be combined with another example. For example, although not shown in FIG. 8, the AMF connection with the SN 206 after the RRC re-establishment message In some embodiments, when the terminal device 208 is in the dual connectivity mode, the data communicated between the terminal device 208 and the MN 204 may differ from that communicated between the terminal device 208 and the SN 206.

In some embodiments, one or more of the steps of the processes illustrated in FIG. 7 and/or FIG. 8 and/or described above may be conditional, in response to a determination either that at least some of, or that all of, the data 808 is associated with a very low latency requirement and/or a high reliability requirement. In particular, in some embodiments, the steps may be conditioned on the data 808 being associated with a URLLC service.

For example, the transmission of the UE context 902 may only occur if the MN 204 determines that some or all of the data 808 is associated with the URLLC service. Additionally or alternatively, in some embodiments, the RRC Re-establishment request message 818 may include parameters based on a stored SN context only if some or all of the data 808 is associated with the URLLC service.

In some embodiments where the RRC Re-establishment request comprises parameters associated with the MN 204 (such as in the example illustrated in FIG. 7), in response to receiving the RRC Re-establishment message 916, the terminal device 208 enters the dual connectivity mode and communicates the data 828 via both the MN 204 and the SN 206. In some such embodiments, the terminal device 208 enters the dual connectivity mode conditionally, only if link quality measurements of transmissions by the MN 204 satisfy pre-determined criteria.

In some embodiments, the parameters 912, 820 included in the RRC Re-establishment Request 818 comprise an authentication token. In some embodiments, the authentication token may be a shortMAC-I field, the shortMAC-I being calculated based on a physical identity of a cell, a C-RNTI, and a security key. In embodiments where the parameters 820 are associated with the SN 206, the physical identity may be that of the cell associated with the SN 206, the C-RNTI may be the temporary identity assigned by the SN 206 for transmissions of data in that cell, and the security key may be a key assigned for encryption or integrity protection of that data. Accordingly, in such embodiments, the SN context stored by the terminal device and the UE context stored at 813 may comprise at least these parameters.

In embodiments where the parameters 912 are associated with the MN 204, shortMAC-I may be calculated based on the physical identity of the cell associated with the MN 204, the C-RNTI may be the temporary identity assigned by the MN 206 for transmissions of data in that cell, and the security key may be a key assigned for encryption or integrity protection of that data. Accordingly, in such embodiments, the MN context stored at 908 and the UE context 902 may comprise at least these parameters.

In some embodiments, the list of cells 904 may be transmitted to the terminal device 208 by the SN 206 instead of by the MN 204.

In some embodiments, the terminal device 208 does not receive the list of cells 904 and accordingly does carry out the determination 910.

In some embodiments, after the transmission of the RRC Re-establishment message 822, 916, the SN 206 may establish a connection to the AMF 220 via the MN 204. In such embodiments, the MN 204 may refrain from transmitting the AMF connection context 812.

In some embodiments, the manner in which the SN 206 establishes a connection with the core network entity such as the AMF 220 may depend on whether the core network entity is part of an enhanced packet core network. In some such embodiments, if the core network entity is part of an enhanced packet core network, then the SN 206 may establish a connection to the core network entity via the MN 204. In some such embodiments, if the core network entity is part of 5G core (5GC) network (for example, the core network entity is the AMF 220), then the SN 206 may establish a direct connection to the core network entity, such as illustrated in the example of FIG. 7.

As described above, once radio link failure has been determined to have occurred, the terminal device 208 may cease communicating the data 808 with either the MN 204 or the SN 206, and as such (or otherwise, for example in response to a determination by the respective radio access node), the MN 204 and SN 206 may no longer perform the role of master node and secondary node.

In some embodiments, after the transmission of the RRC Re-establishment message 916, 822, then the SN 206 may subsequently perform the role of master node. In some embodiments, after the transmission of the RRC Re-establishment message 916, 822, then the terminal device may enter the dual connectivity mode, with the MN 204 and SN 206 subsequently performing the role of master node and secondary node, respectively.

RRC Resume Procedure

In accordance with conventional techniques, an RRC Resume procedure in a wireless telecommunications system may be initiated by a terminal device having a suspended RRC connection, to request that the suspended RRC connection is resumed. When an RRC connection is suspended, context relating to the MCG cell configuration and PDCP state, for the cell associated with the MN, is stored by the terminal device and by the MN. Context associated with the SN is not stored in either the terminal device or the SN, although some proposals have been made according to which the MN would store at least some context associated with the SN.

The RRC Resume procedure may be initiated by the terminal device 208 in response to a trigger. The trigger may be initiated by upper layers (e.g. NAS layers) or by the access stratum of the terminal device 208.

The RRC Resume procedure may comprise the transmission of an RRC Resume Request message on SRB0 using the CCCH by the terminal device. The RRC Resume Request message may comprise a shortened version of an identifier of the terminal device 208, such as a short radio network temporary identifier (RNTI) and an authentication token, such as a resumeMAC-I. The resumeMAC-I may be calculated based on a source physical cell identity, a target cell identity, and a source-C-RNTI, wherein the source physical cell identity and the source-C-RNTI correspond to the cell that the terminal device was connected to at the time of the suspension of the RRC connection, and the target cell identity is that of the cell in which the terminal device is attempting to resume the RRC connection. Upon sending the RRC Resume Request message, the terminal device may resume SRB1, including re-establishing the PDCP entities for SRB1.

If the gNB to which the RRC Resume Request message is transmitted is able to resume the RRC connection then it transmits in response a RRC Resume message on SRB1. In response to receiving the RRC Resume message, the terminal device restores its PDCP state and some cell configuration from the terminal device's stored context. The RRC Resume message may include cell configuration parameters, which may be applied to the stored MCG cell configuration parameters (for example, as a 'delta' or where any parameter present in the RRC Resume message replaces any corresponding parameter in the stored cell configuration), to derive the cell configuration parameters applicable in the current serving cell.

The terminal device may also resume SRB2 and all DRBs which were suspended, and enter RRC connected mode. Additional configuration may be carried out depending on the contents of the RRC Resume message.

It may be that the serving cell of the terminal device when it triggers the RRC Resume procedure is controlled by a node which was the SN, such as the SN 206 when the RRC connection was suspended. Hereinafter this node will be referred to as 'the SN' for clarity, even though it may not perform the role of secondary node while, or after, the RRC connection is suspended. Similarly, the node, such as the MN 204, which was the master node when the RRC connection is suspended will be referred to as 'the MN', even though it may not subsequently perform that role.

According to conventional techniques, the SN 206 must acquire the relevant context associated with the terminal device from the MN 204 (i.e. the node which was acting as the MN when the RRC connection was resumed). This will result in a delay in the resumption of the RRC connection.

In view of the different requirements of new services, in particular relating to transmission latency and reliability, it is desirable to provide a more flexible and faster RRC Resume procedure, particularly where the cell in which the RRC Resume procedure is carried out differs from the cell controlled by the radio access node acting as the MN when the RRC connection was suspended.

In accordance with embodiments of the present technique, the SN 206 may store a context associated with the terminal device 208 while the terminal device 208 has an active RRC connection. In the event of an RRC Resume procedure in which the SN 206 receives a request from the terminal device 208 to resume the RRC connection, the SN 206 transmits a response to the terminal device 208, permitting the terminal device 208 to resume the RRC connection and to enter RRC connected mode. Between receiving the request from the terminal device 208 and transmitting the response, the SN 206 does not request or receiving context from the MN 204 relating to the terminal device 208.

In some embodiments, the terminal device additionally or alternatively stores, while having the active RRC connection, context associated with one or both of the MN 204 and the SN 206. The request to resume the RRC connection transmitted by the terminal device 208 comprises one or more indications based on the stored context.

In some embodiments, the RRC Resume process for connection resumption of the RRC connection may correspond to a process for RRC connection re-establishment in accordance with embodiments of the present technique, as described elsewhere herein, with the following modifications.

First, in place of a determination that RLF criteria have been satisfied, there may be an RRC suspension procedure, which may be in accordance with conventional techniques for RRC suspension while in dual connectivity mode.

Second, an RRC Resume Request message and RRC Resume message may take the place of the RRC Re-establishment request message and RRC Re-establishment message, respectively.

Third, there may be an additional delay prior to the transmission of the RRC Resume Request message, to reflect the possibility that a trigger to initiate the RRC Resume procedure may not occur until some time after the RRC suspension procedure, and may be in response to a particular trigger (as described above in the case of a conventional RRC Resume procedure). In particular, the terminal device 208 may perform cell reselection one or more times, for example as a result of movement of the terminal device 208, between the RRC suspension and RRC Resume procedures.

In accordance with some embodiments of the present technique, the terminal device 208 may store some or all of an MCG configuration which was in effect at the time of the RRC suspension procedure. In some such embodiments, one or more parameters of the MCG configuration may form a part of the UE context 902 which is transmitted from the MN 204 to the SN 206.

In some embodiments, the RRC Resume message transmitted by the SN 206 may comprise cell configuration parameters. The terminal device 208 may, in some such embodiments, consider the SN 206 as the new master node, and determine configuration parameters for the transmission of the data 828 in the selected cell based on a combination of the configuration parameters received in the RRC Resume message and those previously forming the MCG configuration which have been stored by the terminal device 208. In other words, the terminal device 208 may treat the stored MCG configuration parameters as applying to communication with the SN 206 (now acting as the MN), even though the stored MCG configuration parameters previously (prior to suspension) applied to communications with the MN 204. In some such embodiments, after receiving the RRC Resume message, the terminal device is in a single connectivity mode.

In some embodiments, the RRC Resume message transmitted by the SN 206 may comprise cell configuration parameters for a secondary node. In some such embodiments, SN 206 may, after the RRC Resume procedure take on the role of secondary node, and the terminal device 208 may use the cell configuration parameters for a secondary node to control the communication of data with the SN 206. The terminal device 208 may, in addition, use the stored MCG configuration parameters (possibly combined with additional MCG configuration parameters received in the RRC Resume message) to control the communication of data with the MN 204 after the RRC Resume procedure is complete. Thus, in some embodiments, after receiving the RRC Resume message, the terminal device 208 is in the dual connectivity mode.

In some embodiments, where the RRC Resume message comprises parameters sufficient to permit the terminal device 208 to operate in the dual connectivity mode after the RRC Resume procedure, the terminal device 208 may nevertheless delay communication with the MN 204 until radio conditions in the cell associated with the MN 204 satisfy pre-determined criteria.

Non-Access Stratum Connections in Dual Connectivity

Conventionally, the terminal device 208 may be connected to a single AMF instance (such as the AMF 220) in the core network part 202 via a connection between the MN 204 and the AMF 220. The connection with the AMF 220 may be used, in particular, to transmit non-access stratum (NAS) signalling associated with the terminal device 208. NAS signalling may refer to control plane signalling which is broadly independent of the particular radio access node that the terminal device is communicating with, and/or relate to procedures which are broadly independent of the exact logical or physical location of the terminal device 208 within the wireless telecommunications network. NAS signalling may relate to, for example, an attach procedure, an authentication procedure, a session management procedure, and the like.

According to conventional techniques, when the terminal device 208 is in the dual connectivity mode, NAS messages are transmitted directly between the terminal device 208 and the MN 204.

It is, however, desirable to improve the reliability of NAS signalling for terminal devices in dual connectivity mode..

According to embodiments of the present technique, when the terminal device is in the dual connectivity mode, the NAS signalling is transmitted directly between the terminal device 208 and the SN 206. In some embodiments, the NAS signalling transmitted directly between the terminal device 208 and the SN 206 is transmitted using a signalling bearer designated for the transmission of RRC signalling between the terminal device 208 and the SN 206. In some embodiments, the signalling bearer is an SRB3 bearer using a DCCH logical channel. In some embodiments, the signalling bearer is a bearer established between the terminal device 208 and the SN 206 for transmitting the NAS signalling which may be substantially similar to a conventional SRB2 bearer.

In some embodiments, while the terminal device 208 is in the dual connectivity mode, or in response to a determination that the terminal device 208 is to enter the dual connectivity mode, a connection between the SN 206 and the AMF 220 is established.

In some embodiments, the connection between the SN 206 and the AMF 220 does not traverse the MN 204. In some such embodiments, NAS signalling is transmitted between the AMF 220 and the terminal device 208 via the SN 206, without traversing the MN 204.

In some embodiments, NAS signalling is transmitted between the MN 204 and the SN 206, for example via an Xn inter-radio access node interface. In some such embodiments, NAS signalling is transmitted between the AMF 220 and the terminal device 208 via the SN 206 and (via the inter-radio access node interface) the MN 204. In this case there may be a single NAS connection between the terminal device 208 and the core network entity such as the AMF 220 or an MME. It is assumed that the MN entity hosting the connection towards the core network is still present such that, even if the radio connection between the terminal device 208 and the MN 204 is lost, then NAS signalling may be transmitted between the core network and the terminal device 208, via the wireless access interface between the terminal device 208 and the SN node 206.

In some embodiments, the core network entity may be a core network entity other than an AMF. For example, the core network entity which terminates the NAS connections may be a mobility management entity (MME) of an enhanced packet core (EPC) network.

In some embodiments, the routing of the connection between the SN 206 and the core network entity may depend on the type of core network entity. For example, if the core network entity is an AMF (or, in some embodiments, any entity other than an EPC MME), such as the AMF 220, then the connection between the SN 206 and the AMF 220 does not traverse the MN 204. On the other hand, if the core network entity is not an AMF, or, in some embodiments, only if the core network entity is an EPC MME, the NAS signalling is transmitted between the AMF 220 and the terminal device 208 via the SN 206 and via the MN 204.

In some embodiments, NAS signalling is duplicated to provide redundancy. In other words, the same NAS signalling is transmitted between the terminal device 208 and the AMF 220 via the MN 204, and is also transmitted between the terminal device 208 and the AMF 220 via the SN 206.

In some embodiments, if a wireless link metric associated with the communications between the MN 204 and the terminal device falls below a pre-determined threshold (for example, such that a radio link failure would be determined to have occurred in single connectivity mode) NAS signalling continues to be transmitted only via the SN 206 and not directly between the terminal device 208 and the MN 204.

Thus the reliability of NAS signalling can be improved for a terminal device in dual connectivity mode.

Figure 9:
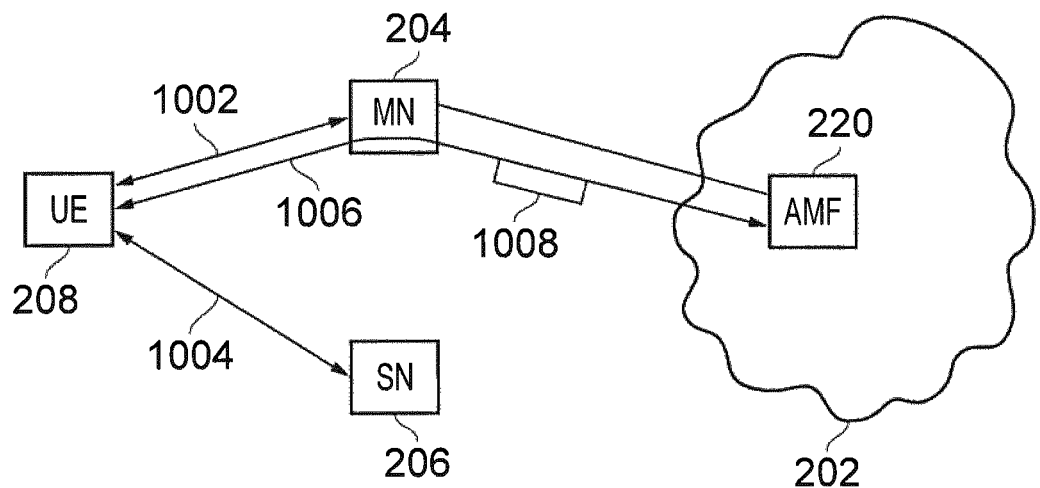
FIG. 9 shows a network configuration in accordance with conventional techniques for the transmission of non-access stratum (NAS) messages associated with a terminal device in dual connectivity mode.

FIG. 9 shows a network configuration in accordance with conventional techniques for the transmission of NAS messages associated with a terminal device in dual connectivity mode.

In FIG. 9, the terminal device 208 is in RRC Connected mode in a dual connectivity configuration, wherein, respectively, first data 1002 and second data 1004 is transmitted between the terminal device 208 and, respectively the MN 204 and SN 206.

A NAS connection 1006 is established between the terminal device 208 and the AMF 220 via the MN 204, for the transmission of NAS signalling, such as a NAS message 1008.

Transmission of the data 1002, 1004 between the radio access nodes and the core network part 202 is not shown in FIG. 9 for clarity.

Figure 10:
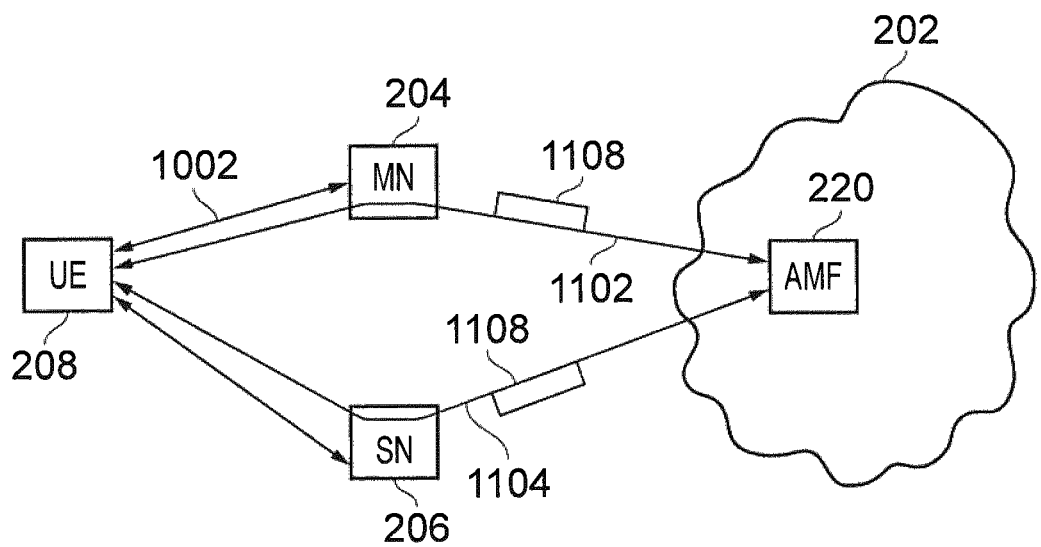
FIG. 10 shows a network configuration in accordance with embodiments of the present technique for the transmission of NAS messages associated with a terminal device in dual connectivity mode.

FIG. 10 shows a network configuration in accordance with embodiments of the present technique for the transmission of NAS messages associated with a terminal device in dual connectivity mode.

As in FIG. 9, the terminal device 208 is in RRC Connected mode in a dual connectivity configuration, wherein, respectively, first data 1002 and second data 1004 is transmitted between the terminal device 208 and, respectively the MN 204 and SN 206.

A first NAS connection 1102 is established between the terminal device 208 and the AMF 220 via the MN 204, for the transmission of NAS signalling, such as a NAS message 1108.

A second NAS connection 1104 is established between the terminal device 208 and the AMF 220 via the SN 206. That is, the SN 206 provides a forwarding function for forwarding NAS messages, generated in the core network entity 220, to the terminal device 208, and for forwarding NAS messages generated in the terminal device 208 and transmitted directly to the SN 206, to the core network entity 220. In some embodiments, as shown in FIG. 10, the NAS message 1108 is also transmitted via the second NAS connection 1104 to provide redundancy.

Figure 11:
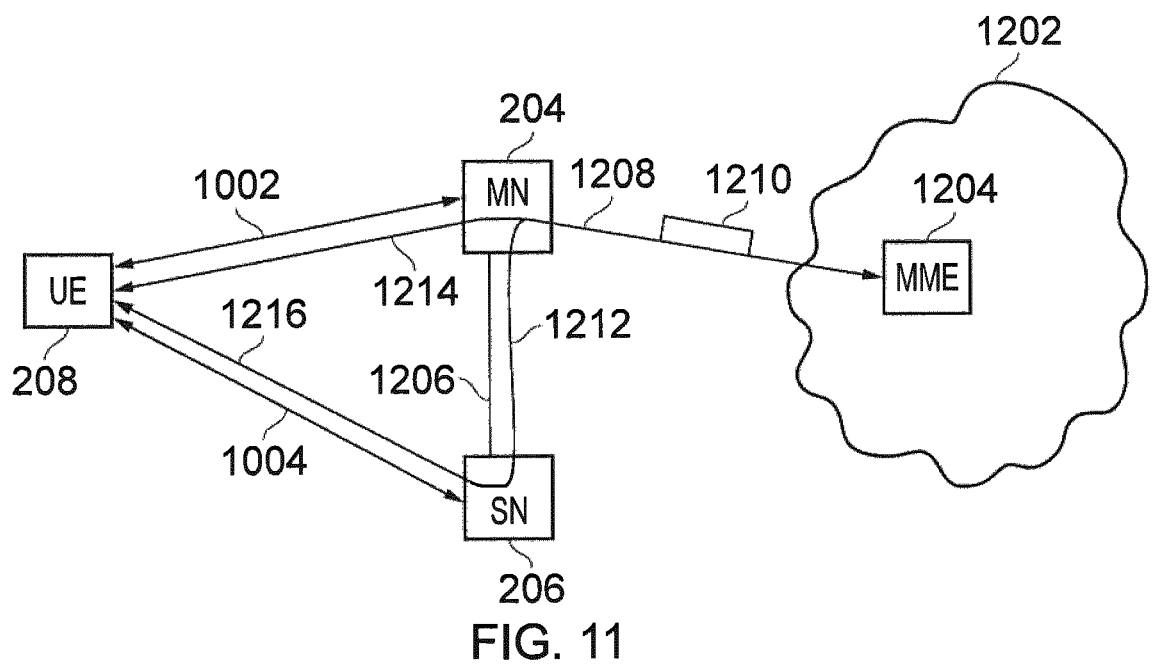
FIG. 11 shows a further network configuration in accordance with embodiments of the present technique for the transmission of NAS messages associated with a terminal device in dual connectivity mode.

FIG. 11 shows a further network configuration in accordance with embodiments of the present technique for the transmission of NAS messages associated with a terminal device in dual connectivity mode.

As in FIGS. 9 and 10, the terminal device 208 is in RRC Connected mode in a dual connectivity configuration, wherein, respectively, first data 1002 and second data 1004 is transmitted between the terminal device 208 and, respectively the MN 204 and SN 206.

In FIG. 11, the core network part 1202 comprises an EPC MME 1204. An inter-radio access node connection 1206, which may be an Xn interface or X2 interface, connects the MN 204 and the SN 206.

A single NAS connection 1208 is established between the terminal device 208 and the MME 1204 via the MN 204, for the transmission of NAS signalling, such as a NAS message 1210. The NAS messages communicated via the NAS connection 1208 may be transmitted directly between the MN 204 and the terminal device 208 via, for example, a signalling radio bearer 1214.

In addition, to provide redundancy and/or resiliency, NAS messages may be transmitted to or from the terminal device 208 via the SN 206. Such NAS messages may be transmitted by a signalling radio bearer 1216 between the terminal device 208 and the SN 206 and via the inter-radio access node connection 1206.

The path for NAS message transmission via the SN 206 may be established by the SN 206 or the MN 204 in response to one or more pre-determined conditions being satisfied. For example, the MN 204 may establish the path in response to determining that radio link failure has occurred in respect of the wireless access interface between the MN 204 and the terminal device 208.

The SN 206 may thus provide a forwarding function for forwarding NAS messages, generated in the core network entity 220 and received at the SN 206 via the inter-radio access node connection 1206 from the MN 204, to the terminal device 208. Similarly, the SN 206 may forward NAS messages generated in the terminal device 208 and transmitted directly to the SN 206, to the core network entity 220 by forwarding the NAS messages to the MN 204 on the inter-radio access node connection 1206.

In some embodiments, the MN 204 may perform de-duplication of NAS messages which are generated by the terminal device 208 and received both directly from the terminal device 208 and via the SN 206, so that only a single instance of duplicate messages is forwarded to the core network entity.

The MN 204 may further perform a duplication of NAS messages which are generated by the core network entity for the terminal device 208, by transmitting a copy of the message directly to the terminal device 208 and a copy of the message to the SN 206, so that even if, for example, radio link failure occurs, at least one instance of the NAS message is received by the terminal device 208. In some embodiments, this duplication may be carried out using a PDCP layer duplication process.

In some embodiments, the establishment of the second NAS connection (such as the second NAS connections 1104, 1212 shown in FIGS. 10 and 11) may be conditional on a determination that the data 1002, 1004 being transmitted between the terminal device 208 and the MN 204 and SN 206 is the same (i.e. redundancy is employed in respect of the data transmissions within the radio access network) and/or that the data 1002, 1004 comprises data having a particular (pre-determined) latency and/or reliability requirements. The pre-determined latency and/or reliability requirements may correspond to those specified for the URLLC service.

As such, in some embodiments, one of the terminal device 208, the MN 204, the SN 206 and the core network entity 220, 1204 may determine whether criteria for establishing a redundant NAS connection via the SN 206 are satisfied. If the criteria are satisfied, then the second NAS connection 1104, 1212 may be established as described above.

Although in FIG. 11 the core network entity is shown as being an EPC MME, in some embodiments the core network entity may be an AMF, such as the AMF 220, or any other appropriate core network entity.

It will be appreciated that aspects of the various embodiments described herein may be combined. For example, in the embodiments illustrated in FIG. 7, a second NAS connection may be established between the SN 206 and the AMF 220 as illustrated in FIG. 10 and described above. Other combinations will be similarly apparent.

Thus there has been described a method of communicating data by a terminal device in a wireless telecommunication system, the wireless telecommunication system comprising a first radio access node and a second radio access node, the method comprising establishing an RRC connection with the first radio access node, entering a dual connectivity mode of operation for the terminal device in which the first radio access node acts as a master radio access node and the second radio access node acts as a secondary radio access node, communicating the same first data between the terminal device and the first radio access node and between the terminal device and the second radio access node, determining that radio link failure criteria are satisfied in respect of at least the first radio access node, transmitting to the second radio access node a re-establishment request message, receiving from the second radio access node a re-establishment response message, the re-establishment response message being transmitted by the second radio access node in response to the re-establishment request message and without the second radio access node requesting context information associated with the terminal device from the first radio access node after receiving the re-establishment request message, and communicating second data between the terminal device and the second radio access node.

There has also been described a method of communicating data by a terminal device in a wireless telecommunication system, the wireless telecommunication system comprising a first radio access node and a second radio access node, the method comprising establishing an RRC connection with the first radio access node, entering a dual connectivity mode of operation for the terminal device in which the first radio access node acts as a master radio access node and the second radio access node acts as a secondary radio access node, communicating the same first data between the terminal device and the first radio access node and between the terminal device and the second radio access node, suspending the RRC connection, transmitting to the second radio access node a resume request message, receiving from the second radio access node a resume response message, the resume response message being transmitted by the second radio access node in response to the resume request message and without the second radio access node requesting context information associated with the terminal device from the first radio access node after receiving the resume request message, and communicating second data between the terminal device and the second radio access node.

There has also been described a method of communicating a non-access stratum, NAS, message by a terminal device in a wireless telecommunication system, the wireless telecommunication system comprising a first radio access node and a second radio access node, the method comprising establishing an RRC connection with the first radio access node, entering a dual connectivity mode of operation for the terminal device in which the first radio access node acts as a master radio access node and the second radio access node acts as a secondary radio access node, communicating a same first data between the terminal device and the first radio access node and between the terminal device and the second radio access node, communicating the NAS message via a first NAS connection between the terminal device and the second radio access node, the first NAS connection connecting the terminal device and a core network entity via the second radio access node.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not significance to the principles of operation described herein.

Respective features of the present disclosure are defined by the following numbered paragraphs:

Paragraph 1. A method of communicating data by a terminal device in a wireless telecommunication system, the wireless telecommunication system comprising a first radio access node and a second radio access node, the method comprising establishing a radio resource control, RRC, connection with the first radio access node and entering an RRC connected mode for communicating the data between the terminal device and the first radio access node in accordance with one or more parameters configured by the first radio access node and associated with the terminal device, entering a dual connectivity mode of operation for the terminal device in which the first radio access node acts as a master radio access node and the second radio access node acts as a secondary radio access node, communicating the same first data between the terminal device and the first radio access node and between the terminal device and the second radio access node, determining that a radio link failure has been detected in respect of at least the first radio access node, transmitting to the second radio access node a re-establishment request message, receiving from the second radio access node a re-establishment response message, the re-establishment response message being transmitted by the second radio access node in response to the re-establishment request message and without the second radio access node requesting context information comprising the one or more parameters associated with the terminal device from the first radio access node after receiving the re-establishment request message, and communicating second data between the terminal device and the second radio access node.

Paragraph 2. A method according to paragraph 1, the method comprising in response to receiving the re-establishment response message, establishing a radio bearer for the communication of the second data between the terminal device and the second radio access node.

Paragraph 3. A method according to paragraph 1 or paragraph 2, the method comprising before determining that the radio link failure criteria are satisfied in respect of at least the first radio access node, receiving a security key associated with the first radio access node, and calculating an authentication token based on the security key associated with the first radio access node, wherein the re-establishment request message comprises the authentication token.

Paragraph 4. A method according to any of paragraphs 1 to 3, wherein in the dual connectivity mode of operation for the terminal device the first data is communicated in a first cell with the first radio access node and in a second cell with the second radio access node, the method comprising before determining that the radio link failure criteria are satisfied in respect of at least the first radio access node, receiving from the first radio access node or the second radio access node a list of cells including the second cell, each cell in the list of cells being associated with a radio access node having stored the context associated with the terminal device for connection re-establishment.

Paragraph 5. A method according to paragraph 4, wherein for each cell in the list of cells, if the terminal device receives a re-establishment response message in that cell, the terminal device may establish a radio bearer for the communication of the second data in the cell.

Paragraph 6. A method according to paragraph 4 or paragraph 5, the method comprising after determining that the radio link failure criteria are satisfied in respect of at least the first radio access node, selecting the second cell, determining that the second cell is in the list of cells, and in response to determining that the second cell is in the list of cells, including in the re-establishment request message one or more parameters based on a parameter associated with the first access node.

Paragraph 7. A method according to paragraph 6, wherein the parameter associated with the first access node is one of a cell identity of the first cell and a radio network temporary identifier assigned to the terminal device by the first radio access node for the transmission of data in the first cell.

Paragraph 8. A method according to any of paragraphs 1 to 7, the method comprising before determining that the radio link failure criteria are satisfied in respect of at least the first radio access node, storing configuration parameters for communicating data in the first cell with the first radio access node.

Paragraph 9. A method according to paragraph 1 or paragraph 2, the method comprising before determining that the radio link failure criteria are satisfied in respect of at least the first radio access node, receiving a security key associated with the second radio access node, and calculating an authentication token based on the security key associated with the second radio access node, wherein the re-establishment request message comprises the authentication token.

Paragraph 10. A method according to paragraph 9, the method comprising before determining that the radio link failure criteria are satisfied in respect of at least the first radio access node, storing configuration parameters for communicating data in the second cell with the second radio access node.

Paragraph 11. A method according to any of paragraphs 1 to 10, the method comprising in response to receiving the re-establishment response message, entering the dual connectivity mode of operation.

Paragraph 12. A method according to any of paragraphs 1 to 11, wherein the re-establishment response message comprises configuration parameters for communicating data in the second cell with the second radio access node.

Paragraph 13. A method of communicating data by a second radio access node in a wireless telecommunication system, the wireless telecommunication system comprising a first radio access node and the second radio access node, the method comprising communicating first data between a terminal device and the second radio access node, the terminal device in a dual connectivity mode of operation in which the first radio access node acts as a master radio access node and the second radio access node acts as a secondary radio access node, wherein the first data is also communicated between the terminal device and the first radio access node, receiving from the terminal device a re-establishment request message, in response to the re-establishment request message and without requesting context information associated with the terminal device from the first radio access node after receiving the re-establishment request message, transmitting to the terminal device a re-establishment response message, and communicating second data between the terminal device and the second radio access node.

Paragraph 14. A method according to paragraph 13, wherein in response to receiving the re-establishment response message, the terminal device establishes a radio bearer for the communication of the second data between the terminal device and the second radio access node.

Paragraph 15. A method according to paragraph 13 or paragraph 14, the method comprising while the terminal device is in the dual connectivity mode of operation, receiving from the first radio access node context information associated with the terminal device.

Paragraph 16. A method according to paragraph 15 wherein the context information associated with the terminal device comprises a parameter based on a security key associated with the terminal device, the security key for the communication of data between the terminal device and the first radio access node, and the re-establishment request message comprises an authentication token, the authentication token calculated based on the security key.

Paragraph 17. A method according to any of paragraphs 13 to 16, wherein in the dual connectivity mode of operation for the terminal device the first data is communicated in a first cell with the first radio access node and in a second cell with the second radio access node, the method comprising transmitting to the terminal device a list of cells including the second cell, each cell in the list of cells being associated with a radio access node having stored parameters associated with the terminal device for connection re-establishment.

Paragraph 18. A method according to paragraph 17, wherein for each cell in the list of cells, if the terminal device receives a re-establishment response message in that cell, the terminal device may establish a radio bearer for the communication of the second data in the cell.

Paragraph 19. A method according to paragraph 13 or paragraph 14, the method comprising transmitting to the terminal device in the dual connectivity mode of operation a security key associated with the second radio access node, wherein the re-establishment request message comprises an authentication token, the authentication token calculated based on the security key associated with the second radio access node.

Paragraph 20. A method according to any of paragraphs 13 to 19, wherein in response to receiving the re-establishment response message, the terminal device enters the dual connectivity mode of operation.

Paragraph 21. A method according to any of paragraphs 13 to 20, wherein the re-establishment response message comprises configuration parameters for communicating data in the second cell with the second radio access node.

Paragraph 22. A method according to any of paragraphs 13 to 21, the method comprising receiving from the first radio access node parameters associated with a first control plane connection between the first radio access node and a core network node, the first control plane connection for the communication of signalling messages associated with the terminal device.

Paragraph 23. A method according to paragraph 22, the method comprising in response to receiving from the terminal device the re-establishment request message, transmitting a connection request to the core network node, the connection request comprising an indication based on the parameters associated with the control plane connection and requesting an establishment of a second control plane connection between the second radio access node and the core network node, the second control plane connection for the communication of signalling messages associated with the terminal device.

Paragraph 24. A method of communicating data by a first radio access node in a wireless telecommunication system, the wireless telecommunication system comprising the first radio access node and a second radio access node, the method comprising communicating first data between a terminal device and the first radio access node, the terminal device in a dual connectivity mode of operation in which the first radio access node acts as a master radio access node and the second radio access node acts as a secondary radio access node, wherein the first data is also communicated between the terminal device and the second radio access node, and while the terminal device is in the dual connectivity mode of operation, transmitting to the second radio access node context information associated with the terminal device, the context information enabling the second radio access node to respond to one or more of a re-establishment request message and a resume request message received from the terminal device without requesting context information associated with the terminal device from the first radio access node after receiving the one or more of the re-establishment request message and the resume request message.

Paragraph 25. A method according to paragraph 24, wherein in the dual connectivity mode of operation for the terminal device the first data is communicated in a first cell with the first radio access node and in a second cell with the second radio access node, the method comprising while the terminal device is in the dual connectivity mode of operation, transmitting to the terminal device a list of cells including the second cell, each cell in the list of cells being associated with a radio access node having stored parameters associated with the terminal device for at least one of connection re-establishment and connection resumption.

Paragraph 26. A method of communicating data by a terminal device in a wireless telecommunication system, the wireless telecommunication system comprising a first radio access node and a second radio access node, the method comprising establishing an RRC connection with the first radio access node, entering a dual connectivity mode of operation for the terminal device in which the first radio access node acts as a master radio access node and the second radio access node acts as a secondary radio access node, communicating the same first data between the terminal device and the first radio access node and between the terminal device and the second radio access node, suspending the RRC connection, transmitting to the second radio access node a resume request message, receiving from the second radio access node a resume response message, the resume response message being transmitted by the second radio access node in response to the resume request message and without the second radio access node requesting context information associated with the terminal device from the first radio access node after receiving the resume request message, and communicating second data between the terminal device and the second radio access node.

Paragraph 27. A method of communicating data by a second radio access node in a wireless telecommunication system, the wireless telecommunication system comprising a first radio access node and the second radio access node, the method comprising communicating first data between a terminal device and the second radio access node, the terminal device in a dual connectivity mode of operation in which the first radio access node acts as a master radio access node and the second radio access node acts as a secondary radio access node, wherein the first data is also communicated between the terminal device and the first radio access node, receiving from the terminal device a resume request message, in response to the resume request message and without requesting context information associated with the terminal device from the first radio access node after receiving the resume request message, transmitting to the terminal device a resume response message, and communicating second data between the terminal device and the second radio access node.

Paragraph 28. A method of communicating a non-access stratum, NAS, message having as its destination a core network entity by a terminal device in a wireless telecommunication system, the wireless telecommunication system comprising a first radio access node and a second radio access node, the method comprising establishing an RRC connection with the first radio access node, entering a dual connectivity mode of operation for the terminal device in which the first radio access node acts as a master radio access node and the second radio access node acts as a secondary radio access node, communicating a same first data between the terminal device and the first radio access node and between the terminal device and the second radio access node, and transmitting the NAS message to the second radio access node for forwarding by the second radio access node.

Paragraph 29. A method according to paragraph 28, the method comprising transmitting the NAS message to the first radio access node.

Paragraph 30. A method according to paragraph 28 or paragraph 29, wherein the second radio access node forwards the NAS message to the first radio access node.

Paragraph 31. A method according to any of paragraphs 28 to 30, wherein the core network entity is one of an Access and Mobility Management Function and a Mobility Management Entity Paragraph 32. A method of communicating a non-access stratum, NAS, message by a second radio access node in a wireless telecommunication system, the wireless telecommunication system comprising a first radio access node and the second radio access node, the method comprising establishing a connection for the communication of NAS signalling associated with a terminal device between the second radio access node and a core network entity, communicating first data between the terminal device and the second radio access node, the terminal device in a dual connectivity mode of operation in which the first radio access node acts as a master radio access node and the second radio access node acts as a secondary radio access node, wherein the first data is also communicated between the terminal device and the first radio access node, receiving the NAS message from the terminal device, and transmitting the NAS message to the core network entity via the connection for the communication of the NAS signalling associated with the terminal device.

Paragraph 33. A method according to paragraph 32, wherein the connection for the communication of the NAS signalling associated with the terminal device comprises a connection between the first radio access node and the second radio access node.

Paragraph 34. A method according to paragraph 32 or paragraph 33, wherein the core network entity is one of an Access and Mobility Management Function and a Mobility Management Entity Paragraph 35. A terminal device for use in a wireless telecommunication system comprising a first radio access node and a second radio access node, the terminal device comprising a controller and a transceiver configured to operate together such that the terminal device is operable to establish a radio resource control, RRC, connection with the first radio access node and to enter an RRC connected mode for communicating the data between the terminal device and the first radio access node in accordance with one or more parameters configured by the first radio access node and associated with the terminal device, to enter a dual connectivity mode of operation for the terminal device in which the first radio access node acts as a master radio access node and the second radio access node acts as a secondary radio access node, to communicate the same first data between the terminal device and the first radio access node and between the terminal device and the second radio access node, to determine that a radio link failure has been detected in respect of at least the first radio access node, to transmit to the second radio access node a re-establishment request message, to receive from the second radio access node a re-establishment response message, the re-establishment response message being transmitted by the second radio access node in response to the re-establishment request message and without the second radio access node requesting context information comprising the one or more parameters associated with the terminal device from the first radio access node after receiving the re-establishment request message, and to communicate second data between the terminal device and the second radio access node.

Paragraph 36. Circuitry for a terminal device for use in a wireless telecommunication system comprising a first radio access node and a second radio access node, the terminal device comprising controller circuitry and transceiver circuitry configured to operate together such that the terminal device is operable to establish a radio resource control, RRC, connection with the first radio access node and to enter an RRC connected mode for communicating the data between the terminal device and the first radio access node in accordance with one or more parameters configured by the first radio access node and associated with the terminal device, to enter a dual connectivity mode of operation for the terminal device in which the first radio access node acts as a master radio access node and the second radio access node acts as a secondary radio access node, to communicate the same first data between the terminal device and the first radio access node and between the terminal device and the second radio access node, to determine that a radio link failure has been detected in respect of at least the first radio access node, to transmit to the second radio access node a re-establishment request message, to receive from the second radio access node a re-establishment response message, the re-establishment response message being transmitted by the second radio access node in response to the re-establishment request message and without the second radio access node requesting context information comprising the one or more parameters associated with the terminal device from the first radio access node after receiving the re-establishment request message, and to communicate second data between the terminal device and the second radio access node.

Paragraph 37. A second radio access node for use in a wireless telecommunication system, the wireless telecommunication system comprising a first radio access node and the second radio access node, the second radio access node comprising a controller and a transceiver configured to operate together such that the second network access node is operable to communicate first data between a terminal device and the second radio access node, the terminal device in a dual connectivity mode of operation in which the first radio access node acts as a master radio access node and the second radio access node acts as a secondary radio access node, wherein the first data is also communicated between the terminal device and the first radio access node, to receive from the terminal device a re-establishment request message, in response to the re-establishment request message and without requesting context information associated with the terminal device from the first radio access node after receiving the re-establishment request message, to transmit to the terminal device a re-establishment response message, and to communicate second data between the terminal device and the second radio access node.

Paragraph 38. Circuitry for a second radio access node for use in a wireless telecommunication system, the wireless telecommunication system comprising a first radio access node and the second radio access node, the second radio access node comprising controller circuitry and transceiver circuitry configured to operate together such that the second network access node is operable to communicate first data between a terminal device and the second radio access node, the terminal device in a dual connectivity mode of operation in which the first radio access node acts as a master radio access node and the second radio access node acts as a secondary radio access node, wherein the first data is also communicated between the terminal device and the first radio access node, to receive from the terminal device a re-establishment request message, in response to the re-establishment request message and without requesting context information associated with the terminal device from the first radio access node after receiving the re-establishment request message, to transmit to the terminal device a re-establishment response message, and to communicate second data between the terminal device and the second radio access node.

Paragraph 39. A first radio access node for use in a wireless telecommunication system, the wireless telecommunication system comprising the first radio access node and a second radio access node, the first radio access node comprising a controller and a transceiver configured to operate together such that the first network access node is operable to communicate first data between a terminal device and the first radio access node, the terminal device in a dual connectivity mode of operation in which the first radio access node acts as a master radio access node and the second radio access node acts as a secondary radio access node, wherein the first data is also communicated between the terminal device and the second radio access node, and while the terminal device is in the dual connectivity mode of operation, to transmit to the second radio access node context information associated with the terminal device, the context information enabling the second radio access node to respond to one or more of a re-establishment request message and a resume request message received from the terminal device without requesting context information associated with the terminal device from the first radio access node after receiving the one or more of the re-establishment request message and the resume request message.

Paragraph 40. Circuitry for a first radio access node for use in a wireless telecommunication system, the wireless telecommunication system comprising the first radio access node and a second radio access node, the first radio access node comprising controller circuitry and transceiver circuitry configured to operate together such that the first network access node is operable to communicate first data between a terminal device and the first radio access node, the terminal device in a dual connectivity mode of operation in which the first radio access node acts as a master radio access node and the second radio access node acts as a secondary radio access node, wherein the first data is also communicated between the terminal device and the second radio access node, and while the terminal device is in the dual connectivity mode of operation, to transmit to the second radio access node context information associated with the terminal device, the context information enabling the second radio access node to respond to one or more of a re-establishment request message and a resume request message received from the terminal device without requesting context information associated with the terminal device from the first radio access node after receiving the one or more of the re-establishment request message and the resume request message.

Paragraph 41. A terminal device for use in a wireless telecommunication system comprising a first radio access node and a second radio access node, the terminal device comprising a controller and a transceiver configured to operate together such that the terminal device is operable to establish an RRC connection with the first radio access node, to enter a dual connectivity mode of operation for the terminal device in which the first radio access node acts as a master radio access node and the second radio access node acts as a secondary radio access node, to communicate the same first data between the terminal device and the first radio access node and between the terminal device and the second radio access node, to suspend the RRC connection, to transmit to the second radio access node a resume request message, to receive from the second radio access node a resume response message, the resume response message being transmitted by the second radio access node in response to the resume request message and without the second radio access node requesting context information associated with the terminal device from the first radio access node after receiving the resume request message, and to communicate second data between the terminal device and the second radio access node.

Paragraph 42. Circuitry for a terminal device for use in a wireless telecommunication system comprising a first radio access node and a second radio access node, the terminal device comprising controller circuitry and transceiver circuitry configured to operate together such that the terminal device is operable to establish an RRC connection with the first radio access node, to enter a dual connectivity mode of operation for the terminal device in which the first radio access node acts as a master radio access node and the second radio access node acts as a secondary radio access node, to communicate the same first data between the terminal device and the first radio access node and between the terminal device and the second radio access node, to suspend the RRC connection, to transmit to the second radio access node a resume request message, to receive from the second radio access node a resume response message, the resume response message being transmitted by the second radio access node in response to the resume request message and without the second radio access node requesting context information associated with the terminal device from the first radio access node after receiving the resume request message, and to communicate second data between the terminal device and the second radio access node.

Paragraph 43. A second radio access node for use in a wireless telecommunication system, the wireless telecommunication system comprising a first radio access node and the second radio access node, the second radio access node comprising a controller and a transceiver configured to operate together such that the second network access node is operable to communicate first data between a terminal device and the second radio access node, the terminal device in a dual connectivity mode of operation in which the first radio access node acts as a master radio access node and the second radio access node acts as a secondary radio access node, wherein the first data is also communicated between the terminal device and the first radio access node, to receive from the terminal device a resume request message, in response to the resume request message and without requesting context information associated with the terminal device from the first radio access node after receiving the resume request message, to transmit to the terminal device a resume response message, and to communicate second data between the terminal device and the second radio access node.

Paragraph 44. Circuitry for a second radio access node for use in a wireless telecommunication system, the wireless telecommunication system comprising a first radio access node and the second radio access node, the second radio access node comprising controller circuitry and transceiver circuitry configured to operate together such that the second network access node is operable to communicate first data between a terminal device and the second radio access node, the terminal device in a dual connectivity mode of operation in which the first radio access node acts as a master radio access node and the second radio access node acts as a secondary radio access node, wherein the first data is also communicated between the terminal device and the first radio access node, to receive from the terminal device a resume request message, in response to the resume request message and without requesting context information associated with the terminal device from the first radio access node after receiving the resume request message, to transmit to the terminal device a resume response message, and to communicate second data between the terminal device and the second radio access node.

Paragraph 45. A terminal device for use in a wireless telecommunication system comprising a first radio access node and a second radio access node, the terminal device comprising a controller and a transceiver configured to operate together such that the terminal device is operable to establish an RRC connection with the first radio access node, to enter a dual connectivity mode of operation for the terminal device in which the first radio access node acts as a master radio access node and the second radio access node acts as a secondary radio access node, to communicate a same first data between the terminal device and the first radio access node and between the terminal device and the second radio access node, and to transmit a non-access stratum, NAS, message to the second radio access node for forwarding by the second radio access node, the NAS message having as its destination a core network entity.

Paragraph 46. Circuitry for a terminal device for use in a wireless telecommunication system comprising a first radio access node and a second radio access node, the terminal device comprising controller circuitry and transceiver circuitry configured to operate together such that the terminal device is operable to establish an RRC connection with the first radio access node, to enter a dual connectivity mode of operation for the terminal device in which the first radio access node acts as a master radio access node and the second radio access node acts as a secondary radio access node, to communicate a same first data between the terminal device and the first radio access node and between the terminal device and the second radio access node, and to transmit a non-access stratum, NAS, message to the second radio access node for forwarding by the second radio access node, the NAS message having as its destination a core network entity.

Paragraph 47. A second radio access node for use in a wireless telecommunication system, the wireless telecommunication system comprising a first radio access node and the second radio access node, the second radio access node comprising a controller and a transceiver configured to operate together such that the second network access node is operable to establish a connection for the communication of non-access stratum, NAS, signalling associated with a terminal device between the second radio access node and a core network entity, to communicate first data between the terminal device and the second radio access node, the terminal device in a dual connectivity mode of operation in which the first radio access node acts as a master radio access node and the second radio access node acts as a secondary radio access node, wherein the first data is also communicated between the terminal device and the first radio access node, to receive a NAS message from the terminal device, and to transmit the NAS message to the core network entity via the connection for the communication of the NAS signalling associated with the terminal device.

Paragraph 48. Circuitry for a second radio access node for use in a wireless telecommunication system, the wireless telecommunication system comprising a first radio access node and the second radio access node, the second radio access node comprising controller circuitry and transceiver circuitry configured to operate together such that the second network access node is operable to establish a connection for the communication of non-access stratum, NAS, signalling associated with a terminal device between the second radio access node and a core network entity, to communicate first data between the terminal device and the second radio access node, the terminal device in a dual connectivity mode of operation in which the first radio access node acts as a master radio access node and the second radio access node acts as a secondary radio access node, wherein the first data is also communicated between the terminal device and the first radio access node, to receive a NAS message from the terminal device, and to transmit the NAS message to the core network entity via the connection for the communication of the NAS signalling associated with the terminal device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN #71, Gothenburg, Sweden, 7 to 10 Mar. 2016

[2] 3GPP document RP-172834, "Work Item on New Radio (NR) Access Technology," NTT DOCOMO, RAN #78, Lisbon, Portugal, 18 to 21 Dec. 2017

[3] 3GPP document RP-182089, "New SID on Physical Layer Enhancements for NR Ultra-Reliable and Low Latency Communication (URLLC)," Huawei, HiSilicon, Nokia, Nokia Shanghai Bell, RAN #81, Gold Coast, Australia, 10 to 13 Sep. 2018

[4] Holma H. and Toskala A, "LTE for UMTS OFDMA and SC-FDMA based radio access", John Wiley and Sons, 2009

[5] 3GPP TS 36.300 version 13.2.0 Release 13 (2016 January)

[6] 3GPP TS 37.340 version 15.3.0 Release 15 (2018 September)

[7] 3GPP TS 38.331 version 15.3.0 Release 15 (2018 September)

[8] 3GPP TS 23.725 version 16.0.0 Release 16 (2018 December)

What is claimed is:

1. A method of communicating data by a terminal device in a wireless telecommunication system, the wireless telecommunication system comprising a first radio access node and a second radio access node, the method comprising:
    establishing a radio resource control, RRC, connection with the first radio access node and entering an RRC connected mode for communicating the data between the terminal device and the first radio access node in accordance with one or more parameters configured by the first radio access node and associated with the terminal device,
    entering a dual connectivity mode of operation for the terminal device in which the first radio access node acts as a master radio access node and the second radio access node acts as a secondary radio access node,
    communicating the same first data between the terminal device and the first radio access node and between the terminal device and the second radio access node,
    determining that a radio link failure has been detected in respect of at least the first radio access node,
    transmitting to the second radio access node a re-establishment request message,
    receiving from the second radio access node a re-establishment response message, the re-establishment response message being transmitted by the second radio access node in response to the re-establishment request message and without the second radio access node requesting context information comprising the one or more parameters associated with the terminal device from the first radio access node after receiving the re-establishment request message,
    communicating second data between the terminal device and the second radio access node,
    before determining that the radio link failure criteria are satisfied in respect of at least the first radio access node, receiving a security key associated with the first radio access node, and
    calculating an authentication token based on the security key associated with the first radio access node,
    wherein the re-establishment request message comprises the authentication token.

2. A method according to claim 1, the method comprising in response to receiving the re-establishment response message, establishing a radio bearer for the communication of the second data between the terminal device and the second radio access node.

3. A method according to claim 1, wherein in the dual connectivity mode of operation for the terminal device the first data is communicated in a first cell with the first radio access node and in a second cell with the second radio access node, the method comprising
 before determining that the radio link failure criteria are satisfied in respect of at least the first radio access node, receiving from the first radio access node or the second radio access node a list of cells including the second cell, each cell in the list of cells being associated with a radio access node having stored the context associated with the terminal device for connection re-establishment.

4. A method according to claim 3, wherein for each cell in the list of cells, if the terminal device receives a re-establishment response message in that cell, the terminal device may establish a radio bearer for the communication of the second data in the cell.

5. A method according to claim 3, the method comprising
 after determining that the radio link failure criteria are satisfied in respect of at least the first radio access node, selecting the second cell,
 determining that the second cell is in the list of cells, and
 in response to determining that the second cell is in the list of cells, including in the re-establishment request message one or more parameters based on a parameter associated with the first access node.

6. A method according to claim 5, wherein the parameter associated with the first access node is one of a cell identity of the first cell and a radio network temporary identifier assigned to the terminal device by the first radio access node for the transmission of data in the first cell.

7. A method according to claim 1, the method comprising
 before determining that the radio link failure criteria are satisfied in respect of at least the first radio access node, storing configuration parameters for communicating data in the first cell with the first radio access node.

8. A method according to claim 1, the method comprising
 in response to receiving the re-establishment response message, entering the dual connectivity mode of operation.

9. A method according to claim 1, wherein the re-establishment response message comprises configuration parameters for communicating data in the second cell with the second radio access node.

10. A method of communicating data by a terminal device in a wireless telecommunication system, the wireless telecommunication system comprising a first radio access node and a second radio access node, the method comprising:
 establishing a radio resource control, RRC, connection with the first radio access node and entering an RRC connected mode for communicating the data between the terminal device and the first radio access node in accordance with one or more parameters configured by the first radio access node and associated with the terminal device,
 entering a dual connectivity mode of operation for the terminal device in which the first radio access node acts as a master radio access node and the second radio access node acts as a secondary radio access node,
 communicating the same first data between the terminal device and the first radio access node and between the terminal device and the second radio access node,
 determining that a radio link failure has been detected in respect of at least the first radio access node,
 transmitting to the second radio access node a re-establishment request message,
 receiving from the second radio access node a re-establishment response message, the re-establishment response message being transmitted by the second radio access node in response to the re-establishment request message and without the second radio access node requesting context information comprising the one or more parameters associated with the terminal device from the first radio access node after receiving the re-establishment request message,
 communicating second data between the terminal device and the second radio access node,
 before determining that the radio link failure criteria are satisfied in respect of at least the first radio access node, receiving a security key associated with the second radio access node, and
 calculating an authentication token based on the security key associated with the second radio access node,
 wherein the re-establishment request message comprises the authentication token.

11. A method according to claim 10, the method comprising
 before determining that the radio link failure criteria are satisfied in respect of at least the first radio access node, storing configuration parameters for communicating data in the second cell with the second radio access node.

12. A terminal device for use in a wireless telecommunication system comprising a first radio access node and a second radio access node, the terminal device comprising a controller and a transceiver configured to operate together such that the terminal device is operable
 to establish a radio resource control, RRC, connection with the first radio access node and to enter an RRC connected mode for communicating the data between the terminal device and the first radio access node in accordance with one or more parameters configured by the first radio access node and associated with the terminal device,
 to enter a dual connectivity mode of operation for the terminal device in which the first radio access node acts as a master radio access node and the second radio access node acts as a secondary radio access node,
 to communicate the same first data between the terminal device and the first radio access node and between the terminal device and the second radio access node,
 to determine that a radio link failure has been detected in respect of at least the first radio access node,
 to transmit to the second radio access node a re-establishment request message,
 to receive from the second radio access node a re-establishment response message, the re-establishment response message being transmitted by the second radio access node in response to the re-establishment request message and without the second radio access node requesting context information comprising the one or more parameters associated with the terminal device from the first radio access node after receiving the re-establishment request message,
 to communicate second data between the terminal device and the second radio access node,
 to, before determining that the radio link failure criteria are satisfied in respect of at least the first radio access node, receive a security key associated with the first radio access node, and to calculate an authentication token based on the security key associated with the first radio access node, wherein the re-establishment request message comprises the authentication token.

\* \* \* \* \*